United States Patent
Stretch et al.

(10) Patent No.: US 11,326,533 B2
(45) Date of Patent: May 10, 2022

(54) CYLINDER DEACTIVATION AND ENGINE BRAKING FOR THERMAL MANAGEMENT

(71) Applicant: EATON INTELLIGENT POWER LIMITED, Dublin (IE)

(72) Inventors: Dale Arden Stretch, Novi, MI (US); James E McCarthy, Jr., Kalamazoo, MI (US)

(73) Assignee: Eaton Intelligent Power Limited, Dublin (IE)

( * ) Notice: Subject to any disclaimer, the term of this patent is extended or adjusted under 35 U.S.C. 154(b) by 186 days.

(21) Appl. No.: 16/067,021

(22) PCT Filed: Dec. 28, 2016

(86) PCT No.: PCT/US2016/069049
§ 371 (c)(1),
(2) Date: Jun. 28, 2018

(87) PCT Pub. No.: WO2017/127219
PCT Pub. Date: Jul. 27, 2017

(65) Prior Publication Data
US 2020/0011257 A1   Jan. 9, 2020

Related U.S. Application Data

(60) Provisional application No. 62/280,405, filed on Jan. 19, 2016, provisional application No. 62/302,107, (Continued)

(51) Int. Cl.
*F01N 3/00* (2006.01)
*F02D 41/02* (2006.01)
(Continued)

(52) U.S. Cl.
CPC ......... *F02D 41/0245* (2013.01); *F02D 13/06* (2013.01); *F02D 41/0087* (2013.01);
(Continued)

(58) Field of Classification Search
CPC .. F02D 13/06; F02D 41/0087; F02D 41/0255; F02D 41/029; F02D 41/3058
(Continued)

(56) References Cited

U.S. PATENT DOCUMENTS

| 4,255,789 A | 3/1981 | Hartford et al. |
| 5,363,270 A | 11/1994 | Wahba |

(Continued)

FOREIGN PATENT DOCUMENTS

| CN | 1404549 A | 3/2003 |
| CN | 101532436 A | 9/2009 |

(Continued)

OTHER PUBLICATIONS

International Search Report and Written Opinion PCT/US2017/047307 dated Jan. 3, 2018; pp. 1-15.
(Continued)

*Primary Examiner* — Jason D Shanske
(74) *Attorney, Agent, or Firm* — Mei & Mark, LLP

(57) ABSTRACT

A method for exhaust temperature management in a multiple-cylinder, reciprocating-piston engine, comprising sensing a low temperature condition of the exhaust and implementing an increased heat output engine cycle pattern for the engine based on the sensed low temperature condition. The increased heat output engine cycle pattern comprises deactivating fuel injection to a first cylinder of the engine, the first cylinder comprising a piston reciprocating between top-dead-center and bottom-dead-center. Also, activating engine braking mode on the first cylinder by opening one or more valves when the piston is away from bottom-dead-center during a compression stroke. A second cylinder of the engine is fired in a combustion mode while the first cylinder is in engine braking mode.

59 Claims, 16 Drawing Sheets

Related U.S. Application Data filed on Mar. 1, 2016, provisional application No. 62/302,021, filed on Mar. 1, 2016, provisional application No. 62/333,621, filed on May 9, 2016, provisional application No. 62/376,128, filed on Aug. 17, 2016, provisional application No. 62/397,796, filed on Sep. 21, 2016, provisional application No. 62/413,451, filed on Oct. 27, 2016.

(51) Int. Cl.
  *F02D 13/06*  (2006.01)
  *F02D 41/00*  (2006.01)
  *F02D 41/30*  (2006.01)

(52) U.S. Cl.
  CPC ....... *F02D 41/029* (2013.01); *F02D 41/0255* (2013.01); *F02D 41/3058* (2013.01); *F02D 2041/0012* (2013.01); *F02D 2200/0802* (2013.01); *F02D 2250/18* (2013.01)

(58) Field of Classification Search
  USPC .......................................................... 60/286
  See application file for complete search history.

(56) References Cited

U.S. PATENT DOCUMENTS

| | | |
|---|---|---|
| 5,490,486 A | 2/1996 | Diggs |
| 5,930,992 A | 8/1999 | Esch et al. |
| 5,954,018 A | 9/1999 | Joshi |
| 6,553,962 B1 | 4/2003 | Russ et al. |
| 6,647,947 B2 | 11/2003 | Boyer et al. |
| 6,714,852 B1 | 3/2004 | Lorenz et al. |
| 7,437,927 B2 | 10/2008 | Yamada et al. |
| 7,523,734 B2 | 4/2009 | Albertson et al. |
| 7,739,018 B2 | 6/2010 | Adachi |
| 7,805,927 B2 | 10/2010 | Brown et al. |
| 7,930,087 B2 | 4/2011 | Gibson et al. |
| 8,437,927 B2 | 5/2013 | Brennan et al. |
| 8,676,478 B2 | 3/2014 | Nakai |
| 9,016,244 B2 * | 4/2015 | Leone ........................ F01N 9/00 123/25 C |
| 9,157,339 B2 | 10/2015 | Stretch et al. |
| 9,175,613 B2 | 11/2015 | Parsels et al. |
| 9,249,740 B2 | 2/2016 | Matsuda et al. |
| 9,273,622 B2 | 3/2016 | Glugla |
| 9,458,780 B2 | 10/2016 | Burleigh et al. |
| 10,161,336 B2 | 12/2018 | Doering et al. |
| 10,247,072 B2 * | 4/2019 | Younkins ............... F01N 11/005 |
| 10,526,934 B2 | 1/2020 | McCarthy et al. |
| 10,563,549 B2 | 2/2020 | McCarthy et al. |
| 10,619,525 B2 | 4/2020 | McCarthy et al. |
| 2003/0172900 A1 | 9/2003 | Boyer et al. |
| 2004/0255576 A1 | 12/2004 | Brown et al. |
| 2005/0131618 A1 | 6/2005 | Megli et al. |
| 2007/0131183 A1 | 6/2007 | Shei |
| 2007/0261656 A1 | 11/2007 | Albertson et al. |
| 2008/0041336 A1 | 2/2008 | Gibson et al. |
| 2008/0230028 A1 * | 9/2008 | Dingle ..................... F01L 1/462 123/90.65 |
| 2008/0271709 A1 * | 11/2008 | Dingle ..................... F02D 15/04 123/447 |
| 2008/0295493 A1 * | 12/2008 | Applegate ............. F02D 41/024 60/286 |
| 2009/0013669 A1 * | 1/2009 | Winstead ................ F02D 13/06 60/278 |
| 2009/0306846 A1 | 12/2009 | Jeong |
| 2010/0139247 A1 * | 6/2010 | Hiemstra ................ F01N 9/002 60/277 |
| 2011/0088642 A1 | 4/2011 | Ezaki |
| 2012/0102920 A1 * | 5/2012 | Pipis, Jr. .................. F01N 3/103 60/274 |
| 2012/0221217 A1 * | 8/2012 | Sujan ...................... F16H 59/76 701/54 |
| 2012/0296553 A1 | 11/2012 | Bagnasco et al. |
| 2013/0110375 A1 | 5/2013 | Gunewardena |
| 2013/0177482 A1 * | 7/2013 | Ikawa .................. F02D 41/0235 422/109 |
| 2014/0034010 A1 * | 2/2014 | Serrano ............... F02D 41/0087 123/324 |
| 2014/0158087 A1 * | 6/2014 | Silver ................... F02B 75/021 123/295 |
| 2014/0110130 A1 | 7/2014 | Lembcke |
| 2014/0190431 A1 | 7/2014 | McCarthy, Jr. |
| 2014/0360477 A1 | 12/2014 | Doering |
| 2015/0075458 A1 | 3/2015 | Parsels et al. |
| 2015/0152796 A1 | 6/2015 | Zhang |
| 2015/0167583 A1 * | 6/2015 | Sakamoto ................ F01P 1/02 60/323 |
| 2015/0192080 A1 | 7/2015 | Younkins et al. |
| 2015/0203118 A1 | 7/2015 | Mitsuyasu |
| 2015/0354484 A1 | 12/2015 | Zur et al. |
| 2016/0003169 A1 * | 1/2016 | Leone ................. F02D 41/3094 123/481 |
| 2016/0025021 A1 * | 1/2016 | Hilditch ............. F02D 41/0052 60/274 |
| 2016/0123200 A1 * | 5/2016 | Ramappan .............. F02D 37/02 60/285 |
| 2016/0169064 A1 | 6/2016 | Radulescu |
| 2016/0281547 A1 * | 9/2016 | Kizhakkethara ...... F01L 1/2422 |
| 2016/0332631 A1 * | 11/2016 | Roos ..................... F01N 11/002 |
| 2016/0369682 A1 * | 12/2016 | Kim ......................... F01N 9/00 |
| 2017/0356381 A1 * | 12/2017 | Richards ................. F02D 13/06 |
| 2018/0022352 A1 | 1/2018 | Leone et al. |
| 2018/0274457 A1 | 9/2018 | McCarthy, Jr. et al. |
| 2019/0178168 A1 | 6/2019 | McCarthy, Jr. et al. |
| 2019/0277206 A1 | 9/2019 | McCarthy, Jr. et al. |
| 2020/0011257 A1 | 1/2020 | Stretch et al. |
| 2020/0088116 A1 | 3/2020 | McCarthy, Jr. et al. |
| 2020/0208546 A1 | 7/2020 | McCarthy et al. |

FOREIGN PATENT DOCUMENTS

| | | |
|---|---|---|
| CN | 101970839 A | 2/2011 |
| CN | 102003288 A | 4/2011 |
| CN | 103670730 A | 3/2014 |
| CN | 104204471 A | 12/2014 |
| CN | 104204471 A | 12/2014 |
| CN | 104234842 A | 12/2014 |
| CN | 104870788 A | 8/2015 |
| CN | 104870788 A | 8/2015 |
| CN | 104895685 A | 9/2015 |
| EP | 0447697 B1 | 5/1994 |
| EP | 1310649 A1 | 5/2003 |
| EP | 1344925 A1 | 9/2003 |
| GB | 2531309 A | 4/2016 |
| JP | 2007292036 A | 11/2007 |
| WO | 20120118865 A2 | 9/2012 |
| WO | 2015031887 A1 | 3/2015 |
| WO | 2017053898 A1 | 3/2017 |
| WO | 2017117289 A1 | 7/2017 |
| WO | 2017127219 A1 | 7/2017 |
| WO | 2018035302 A1 | 2/2018 |

OTHER PUBLICATIONS

International Search Report and Written Opinion PCT/US2016/069049 dated Apr. 14, 2017; pp. 1-20.
International Search Report and Written Opinion PCT/US2016/069013 dated Apr. 13, 2017; pp. 13.
Alan Falkowski et al: "2004-01-2106 Design and Development of the DaimlerChrysler Deactivation System 5.7L HEMI Engine Multi-Displacement Cylinder", May 7, 2004 (May 7, 2004), XP055725853, Retrieved from the Internet: URL:https://doi.org/10.4271/2004-01-2106/ [retrieved on Aug. 28, 2020].
International Search Report and Written Opinion for PCT/US2016/053590, dated Dec. 29, 2016; pp. 1-15.

* cited by examiner

CYLINDER DEACTIVATION AND ENGINE BRAKING FOR THERMAL MANAGEMENT

This is a § 371 National Stage Entry of PCT/US2016/069049 filed Dec. 28, 2016, and claims the benefit of U.S. provisional applications No. 62/280,405, filed Jan. 19, 2016, 62/302,107 filed Mar. 1, 2016, 62/302,021 filed Mar. 1, 2016, 62/333,621 filed May 9, 2016, 62/376,128 filed Aug. 17, 2016, 62/397,796 filed Sep. 21, 2016, and 62/413,451 filed Oct. 27, 2016 all of which are incorporated herein by reference in their entireties.

FIELD

This application provides an engine where cylinders are selectively deactivated and reactivated while other cylinders selectively engine brake to manage thermal aspects.

BACKGROUND

To meet emissions standards, such as Federal Testing Procedures (FTP), engine systems can include an aftertreatment system. But, it is necessary to heat the aftertreatment system to the correct temperature. Otherwise, a diesel engine generates too much NOx during operation. It is particularly difficult to heat the aftertreatment during low load and idle conditions, where exhaust quantity is low and fuel use is inefficient.

SUMMARY

The systems and methods disclosed herein overcome the above disadvantages and improves the art by way of a method for exhaust temperature management in a multiple-cylinder, reciprocating-piston engine. The method comprises sensing a low temperature condition of the exhaust and implementing an increased heat output engine cycle pattern for the engine based on the sensed low temperature condition. The increased heat output engine cycle pattern comprises deactivating fuel injection to a first cylinder of the engine, the first cylinder comprising a piston reciprocating between top-dead-center and bottom-dead-center. Also, activating engine braking mode on the first cylinder by opening one or more valves when the piston is away from bottom-dead-center during a compression stroke. A second cylinder of the engine is fired in a combustion mode while the first cylinder is in engine braking mode.

The method can further comprise deactivating at least one cylinder in a cylinder deactivation mode, comprising deactivating fuel injection to a third cylinder of the engine, and deactivating an intake valve and an exhaust valve to close the third cylinder.

The method can further comprise sensing a load demand on the engine, calculating an air to fuel ratio for the second cylinder to meet the load demand, and adjusting fuel injected to the second cylinder to meet the load demand.

The method can further comprise supplying an amount of air and an amount of fuel to the second cylinder to maximize heat output from the second cylinder or to maximize torque output from the second cylinder.

The method can further comprise supplying an amount of air and an amount of fuel to the second cylinder based on the sensed low temperature condition.

The method can further comprise calculating a delta temperature between the sensed low temperature condition and a predetermined threshold temperature. It is possible to adjust the amount of air and the amount of fuel supplied to the second cylinder based on the delta temperature.

The method can further comprise respective intake valves and respective exhaust valves of the one or more valves of the first cylinder and of the third cylinder configured to switch between active engine braking mode, deactivated cylinder deactivation mode, and firing in combustion mode. The method further comprises calculating a delta temperature between the sensed low temperature condition and a predetermined threshold temperature. It is possible to switch between active engine braking mode, deactivated cylinder deactivation mode, and firing in combustion mode on the respective intake valves and on the respective exhaust valves of the first cylinder and the third cylinder based on the delta temperature.

A multiple cylinder diesel engine system can comprise a multiple cylinder diesel engine comprising a respective intake valve and a respective exhaust valve for each of the multiple cylinders. A valve control system can be connected to selectively deactivate a respective intake valve and a respective exhaust valve for a selected first cylinder of the multiple cylinder diesel engine, and can be connected to selectively engine brake a selected second cylinder of the multiple cylinder diesel engine, and can be connected to selectively follow a firing stroke pattern on a third cylinder of the multiple cylinder diesel engine. A fuel injection control system can be connected to selectively deactivate fuel injection to the selected deactivated first cylinder and to the selected engine braking second cylinder while selectively increasing fuel to the firing third cylinder. Deactivation of the first cylinder comprises the valve control system deactivating the respective intake valve and the respective exhaust valve while the fuel injection control system deactivates fuel injection to the deactivated cylinder. Engine braking of the selected second cylinder comprises the valve control system opening one or both of the respective intake valve and the respective exhaust valve for the second cylinder to implement an engine brake routine.

A method for exhaust temperature management in a multiple-cylinder combustion engine can comprise selectively deactivating fuel injection to a first cylinder and to a second cylinder of the multiple-cylinder combustion engine during an engine cycle pattern. Selectively deactivating an intake valve and an exhaust valve of the first cylinder closes the first cylinder during the engine cycle pattern. Selectively engine-braking the second cylinder occurs by opening one of the valves of the second cylinder after a compression stroke of the engine during the engine cycle pattern.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures. Phrases such as "upstream" and "downstream" are used to assist with directionality of flow from a fluid input point to a fluid output point. Fluids in this disclosure can comprise a variety of compositions, including fresh or ambient air, exhaust gas, other combustion gasses, vaporized fuel, among others. This disclosure primarily focusses on diesel engine operation, but tenets of the disclosure can be applied to other fueled engines and engine systems, including those fueled by biofuels and other petroleum products such as gasoline, and including hybrid-electric vehicles.

Figure 12:
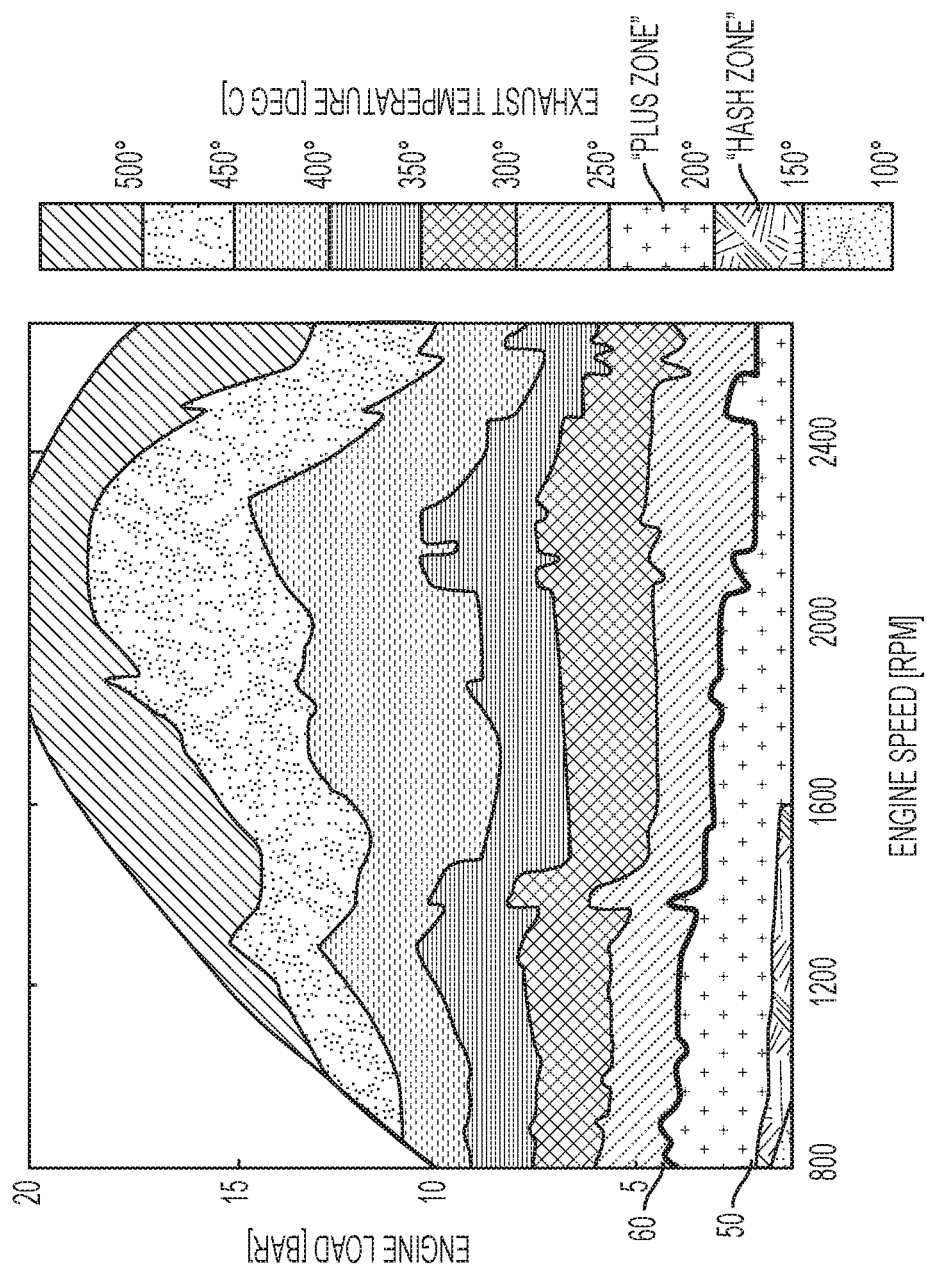
FIGS. 12 & 13 show additional aspects of thermal management.
Figure 13:
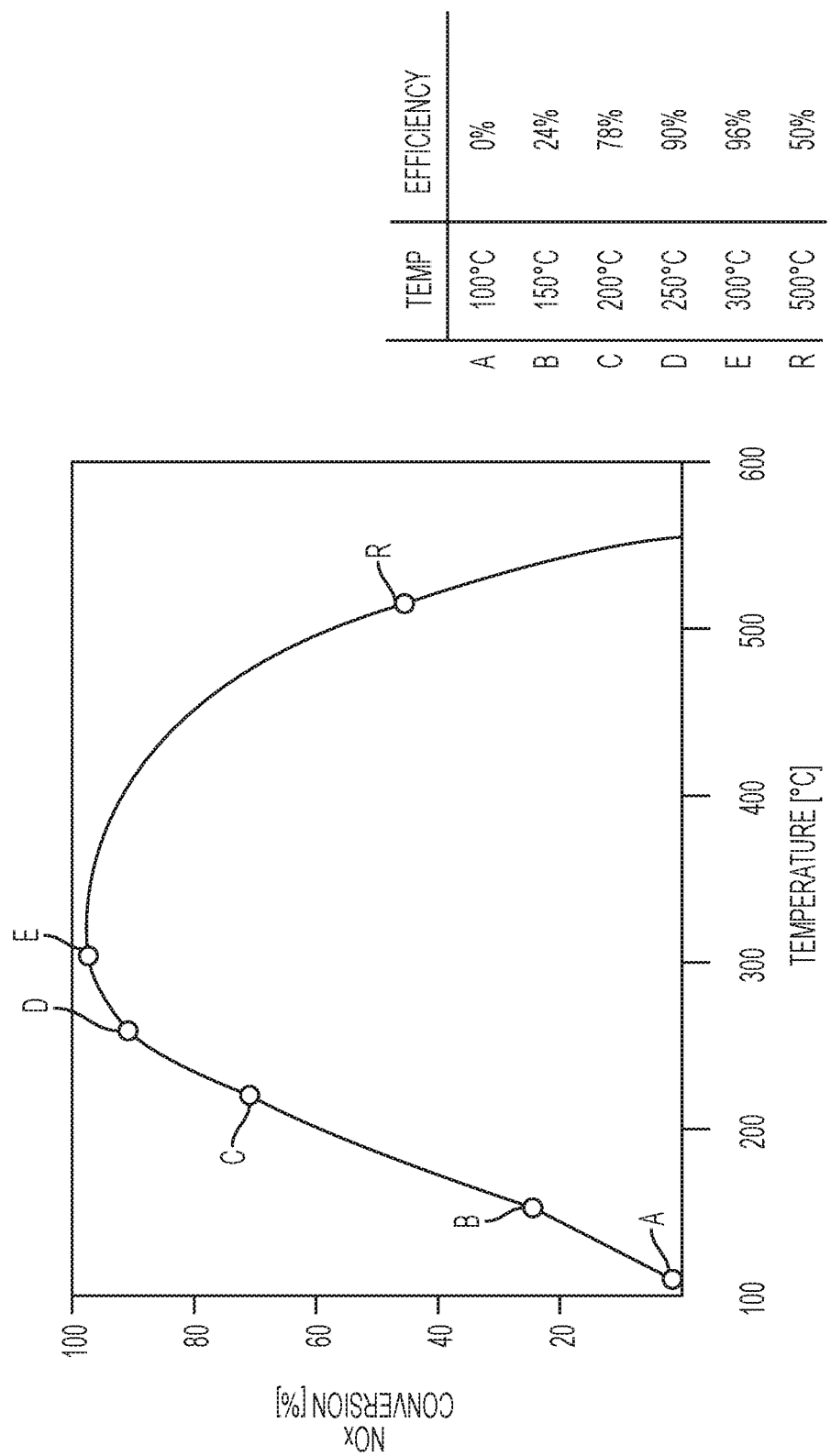

In a first aspect, decreasing the time to heat the catalyst 800 is advantageous for many vehicles, especially medium and heavy duty diesel machinery. Most off-highway machinery cannot meet current FTP (Federal Testing Procedure) NOx requirements because the majority of their operation time is spent at low load. Contrasting FIGS. 12 &13, it can be seen for the example vehicle that the temperature of the exhaust can vary based on the rotations per minute (RPM) of the crankshaft 101 and based on the engine load, which is given in Bar. When implementing an exhaust temperature management method disclosed herein, a large amount of the engine operating range can result in an exhaust temperature that makes catalyst 800 operate to filter pollution efficiently. Without one of the techniques disclosed herein, ordinary all-cylinder combustion mode operation achieves a pollution-filtering temperature at line 60 of FIG. 12. However, utilizing one of the techniques disclosed herein results in lower load requirements to achieve catalyst 800 operational efficiency. Efficiencies are shown in FIG. 13. For the sample catalyst 800, the catalyst 800 efficiently converts NOx (nitrous oxide or nitric oxide) and prevents its expulsion to the atmosphere based on the temperature and material composition of the catalyst 800.

FIG. 13 shows one example of a catalyst 800. Adjusting the filtration materials of the catalyst 800 will shift the illustrated line. For the example, the catalyst 800 has a "bed" of material through which the exhaust 420 passes. The heat of that "bed" impacts the efficiency of the pollution capture. Nitric and Nitrous Oxides (NOx) is the target pollutant of FIG. 13. Other pollutants, such as Sulphur or hydrocarbons can be target pollutants, among others. At 100 degrees Centigrade, the catalyst is 0% efficient to capture NOx (point A). At 150 degrees, the catalyst converts only 24% NOx (point B). Raising the exhaust temperature to 200 degrees Centigrade (point C) brings NOx conversion efficiency up to 78%, with 90% efficiency at 250 degrees (point D) and 96% efficiency at 300 degrees Centigrade (point E). For the example catalyst, it is therefore ideal to have an exhaust temperature near 300 degrees Centigrade. The thermal management techniques disclosed herein drastically reduce the time to bring the catalyst 800 to an efficient pollution-filtering temperature. For example, many off-highway vehicles fail to meet Federal Testing Procedure (FTP) standards because they take 7 to 20 minutes to reach an efficient temperature, if at all. Using the on-demand techniques disclosed herein, CDA mode, engine-braking mode, or both can be implemented within one engine cycle, or within two strokes of the piston 160. This generates heat very quickly. Instead of 7 to 20 minutes, a catalyst 800 can reach an efficient pollution filtering temperature in 10 to 550 seconds, more preferably, within 10-90 seconds, or within 90-180 seconds. Additional achievable time ranges for heating an aftertreatment device to a target temperature, such as at or above 250 degrees Centigrade, comprise 100 to 180 seconds and between 90 and 120 seconds.

Material selection limits at what temperature the catalyst is efficient, at what temperature the catalyst is ruined via sintering effects, and at what temperature the catalyst can conduct diesel particulate regeneration (DPR) at point R. Regeneration processes burn off pollutants at a high heat, which limits the pollutant's atmospheric entry and environmental pollution. Burning off the pollution renews the catalyst 800 to capture pollution anew. FIG. 13 shows that at a regeneration temperature of 500 degrees Centigrade, the catalyst is only 50% efficient at capturing NOx. Commensurate with conducting diesel particulate regeneration of the catalyst 800, it is possible to run a timer. When an exhaust time exceeding a time threshold is sensed, the computer controller 1400 can execute control programming to enter a diesel particulate regeneration mode by implementing the increased heat output mode.

Using a cylinder to combust fuel at an optimal air to fuel ratio (AFR) emits a higher temperature and higher pollution level exhaust stream. However, the fuel efficiency for the optimal AFR combustion is quite high, and the torque output is high. Cutting fuel to some of the cylinders and closing affiliated valves permits heat generation via a combustion stroke on the closed cylinder. Heating a charge in this manner removes the pollution of combustion from some of the cylinders and increases the cylinder's fuel economy. Various exhaust temperature management methods can be implemented to heat an aftertreatment system to a temperature at which the catalyst 800 efficiently absorbs or converts pollutants. Cylinder deactivation (CDA) and engine-braking (compression release braking, or CRB) are two techniques for raising the temperature of the exhaust stream leaving an engine. The techniques help the engine system meet pollution requirements.

Turning to FIGS. 1 & 4A-4C, a schematic for an engine system 10 is shown. An engine 100 comprises 6 cylinders 1-6. Other numbers of cylinders can be used, but for discussion, 4 or 6 cylinders are illustrated. The cylinders 1-6 receive intake fluid, which is combustion gas, such as air, or air mixed with exhaust (exhaust gas recirculation "EGR"), from the intake manifold 103. An intake manifold sensor 173 can monitor the pressure, flow rate, oxygen content, exhaust content or other qualities of the intake fluid. The intake manifold 103 connects to intake ports 133 in the engine block to provide intake fluid to the cylinders 1-6. In a diesel engine, the intake manifold has a vacuum except when the intake manifold is boosted. CDA is beneficial, because the cylinder can be closed. Fuel efficiency is gained by not drawing the piston down against the manifold vacuum. When the cylinder is deactivated, the crankshaft 101 has less resistance from the piston, and the crankshaft can output more torque from the firing cylinders.

Fuel is injected to individual cylinders via a fuel injection controller 300. The fuel injection controller 300 can adjust the amount and timing of fuel injected in to each cylinder and can shut off and resume fuel injection to each cylinder. The fuel injection for each cylinder 1-6 can be the same or unique for each cylinder 106, such that one cylinder can have more fuel than another, and one cylinder can have no fuel injection, while others have fuel.

A user input sensor 900 can be linked to the engine system 10 to sense user inputs such as braking, acceleration, start-up mode selection, shut-down mode selection, auxiliary device activation, among others. The user selections can impact the load requirements for the engine system 10, and the power settings for the cylinders 1-6 can be adjusted in response to the user selections. The valve control by VVA controller 200 and fuel injection from fuel controller 300 can be tailored based on the user selections sensed by user input sensor 900. When the thermal management program is pre-programmed, and real time temperature sensing is not required for all operating conditions, it is possible to implement certain thermal management engine cycle pattern based on a user input or other data point collected by sensors other than thermal sensors. For example, if a certain load is placed on the engine 100, it is possible to pre-program that the temperature of the exhaust will be too hot or too cold, and to implement changes to the operational modes without thermal feedback, per se.

A variable valve actuator (VVA) controller 200 also couples to the cylinders 1-6 to actuate intake valves 130 and exhaust valves 150. The VVA controller 200 can change the actuation of intake valves 130 and exhaust valves 150 so as to open or close the valves normally, early, or late, or combinations thereof, or cease operation of the valves. VVA controller 200 can cooperate with a valve actuator 185, such as a hydraulic, electric, or electric solenoid system to control the intake and exhaust valves 130, 150. The valve actuators 185 for each cylinder 1-6 can be the same for all cylinders 106, thus enabling each valve of each cylinder to switch between combustion mode, deactivated mode, or compression release braking (CRB) mode. Or, the valve actuators 185 can differ between the intake valves 130 and the exhaust valves 150, so that certain functionality is only enabled on one or the other of those valves. Or, commensurate with below discussions, the functionality can be distributed so that some valves can switch between combustion mode and deactivated mode, while others can switch between combustion mode and CRB mode. And, when more than one intake valve or more than one exhaust valve are used per cylinder 106, the valve actuators 185 can be the same or different for each of those valves.

Figure 3A:
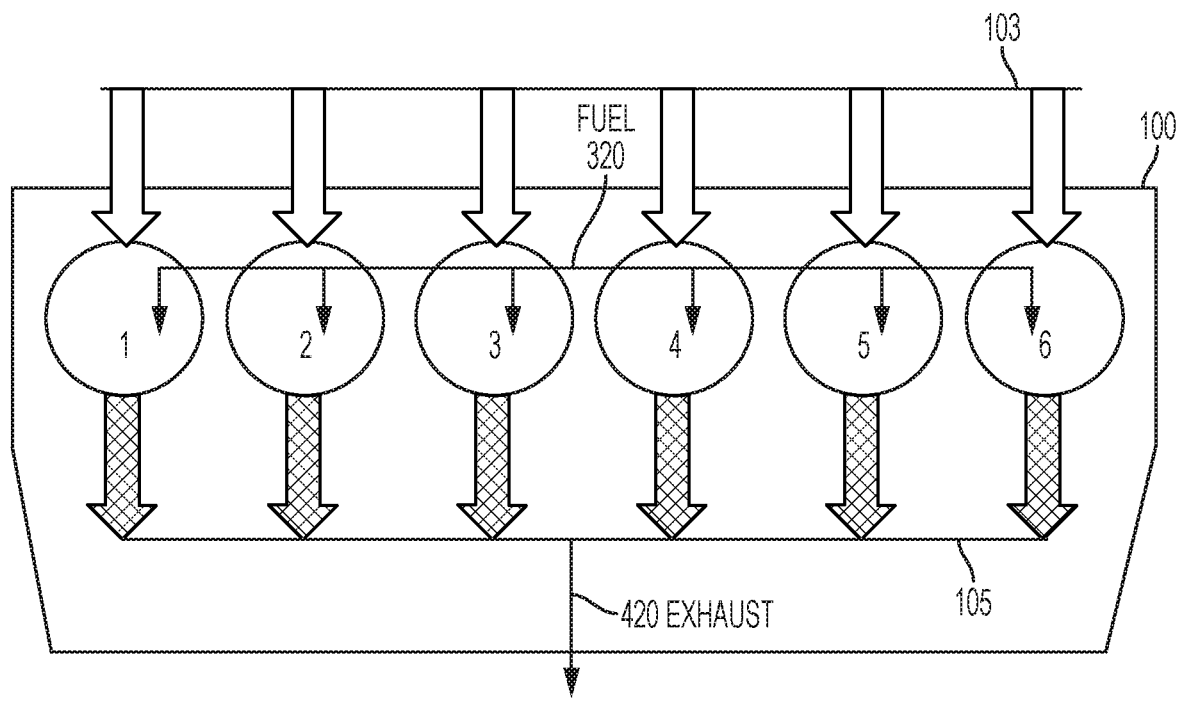
FIGS. 3A-3E show aspects of engine cylinder control.
Figure 3B:
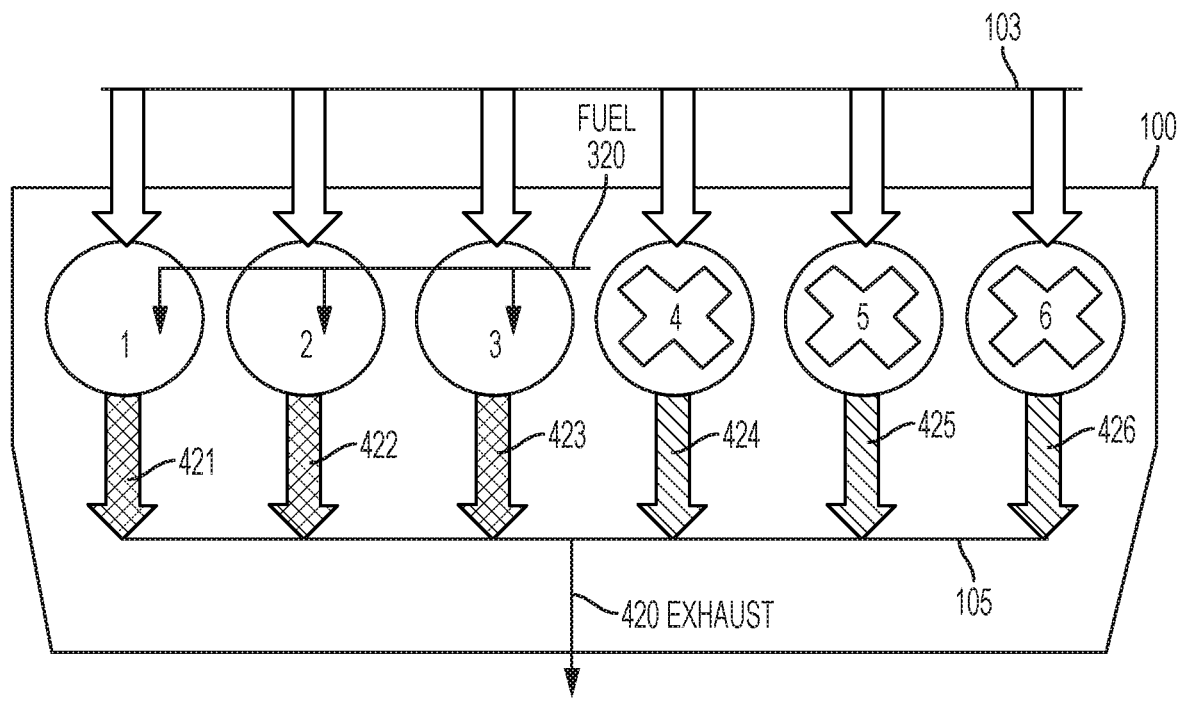
Figure 3C:
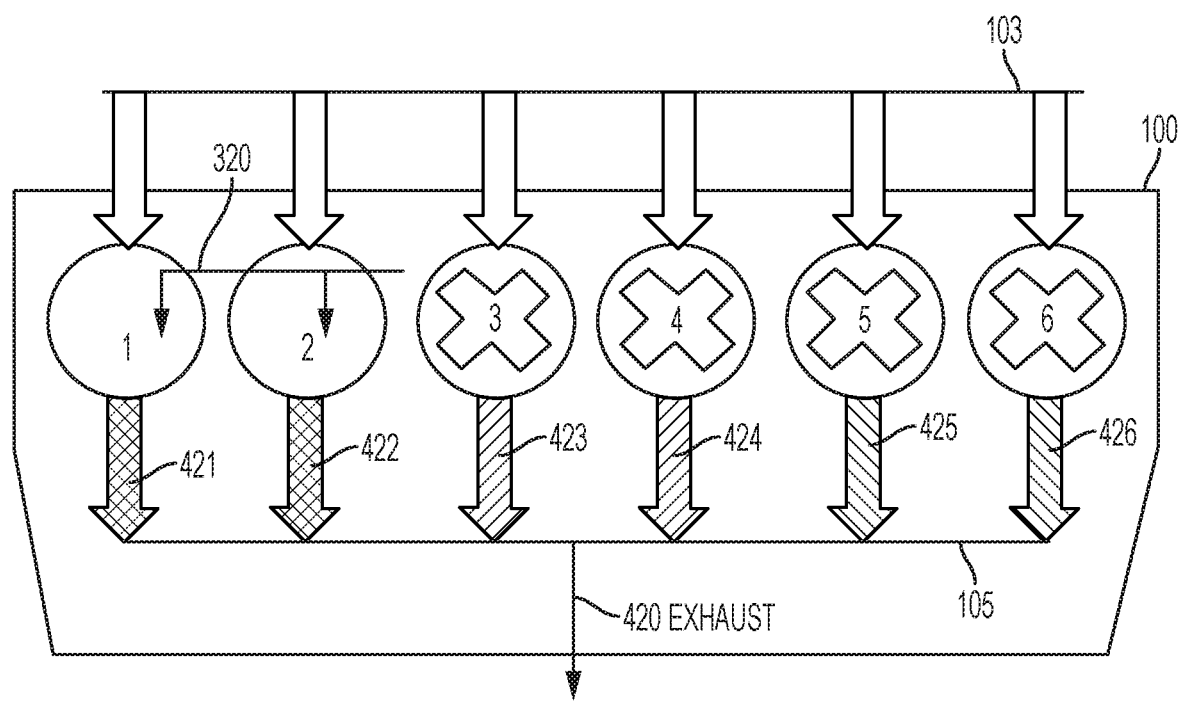

For example, as shown in FIG. 3A, intake fluid is supplied via intake manifold 103 to each cylinder 1-6. Fuel 320 is injected by fuel injector 310 to each of the cylinders 1-6. Exhaust 420 leaves exhaust manifold 105. This all-cylinder operation mode can be enabled by a variety of valve actuators 185. In FIG. 3B, half of the engine 100 does not receive fuel 320. When a start-up mode initiates the sensing of a low temperature condition of the exhaust, deactivating fuel injection to a first cylinder of the engine can comprise inhibiting fuel injection to some cylinders at start-up, or the affirmative deactivation of fuel injection. However, each exhaust stream 421, 422, 423 can differ from having different quantities of fuel 320 injected, or as by having different periods for combustion enabled via valve actuators 185. For example, cylinder 1 could have late intake valve closing (LIVC) enabled to impact the air fuel ratio of that cylinder. The other cylinders could have increased fueling, but normal valve actuation. The resulting exhaust stream 421 differs from exhaust streams 422, 423. Cylinders 4-6 could be compression release braked, and the exhaust streams 424-426 therefor differ from exhaust streams 421-423. In FIG. 3C, combustion exhaust streams 421, 422 differ from cylinder deactivation exhaust streams 423, 423, which differ from CRB exhaust streams 425, 426. Only cylinders 1 & 2 of FIG. 3C receive fuel 320, while the others generate heat via compression, and release the heat according to the desired mode.

Figure 3D:
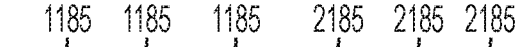

One example for a modulation technique for the valve actuator layout of FIG. 3B can be seen in FIG. 3D. In FIG. 3D, first actuators 1185 are configured to switch between engine braking and firing in combustion mode. Second actuators 2185 are configured to switch between cylinder deactivation mode and firing in combustion mode. The engine 100 can at times function as two engines having a firing half and a heat-management half. For example, at start-up and under first low load conditions, engine braking can be used on cylinders 1-3, while cylinders 4-6 fire. Idling and loaded idling can comprise the first low load conditions, such as when a bus stops for passengers and actuates a lift mechanism, or such as when an off-highway vehicle performs an earth moving function. A second low load condition, such as low speed motion, can comprise cylinders 1-3 firing and cylinders 4-6 being deactivated. A high load condition, such as highway acceleration, can comprise all cylinders 1-6 firing in combustion mode. The actuators 1185 & 2185 can comprise a variety of enabling mechanisms, as above.

Figure 3E:
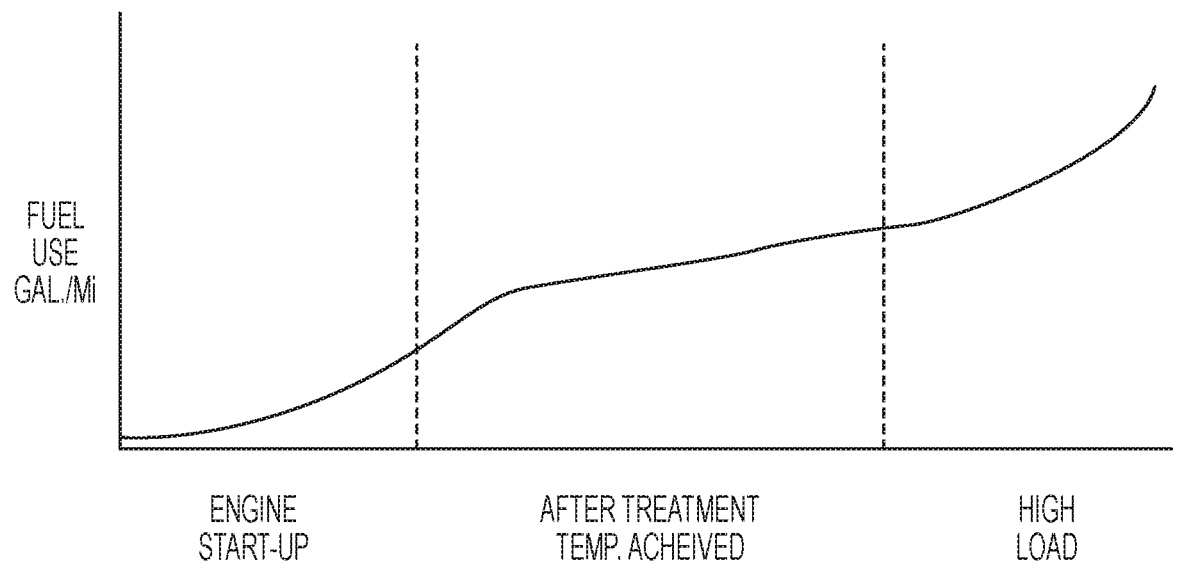

As shown in FIG. 3E, a fuel use line shows that fuel consumption increases from the start-up of the engine through the high load condition. Having low load conditions, the portion between start-up and high load has more stable fuel use. Once a threshold aftertreatement temperature is achieved, the fuel use can be more tailored towards the engine output power setting, and less towards heat generation. Achieving the higher efficiency NOx conversion of points D & E remains a goal, but tradeoffs between NOx generation via high heat operation, and NOx capture can be made to limit the fuel use designated for heat management versus meeting engine power setting requirements. So, in one example, the threshold aftertreatment temperature can correspond to line 50 of FIG. 12. Once the load and RPMs of the engine cross line 60 of FIG. 12, the all-cylinder operation modes can be used above the line 5. Cylinder deactivation becomes a fuel-savings option once the threshold aftertreatment temperature is achieved. Engine braking can remain an emergency or dedicated braking technique throughout engine operation, but its use for thermal management changes once the threshold aftertreatment temperature is achieved. As another example, during diesel particulate filter regeneration (DPF), the threshold aftertreatment temperature can correspond to point R in FIG. 13.

Figure 4B:
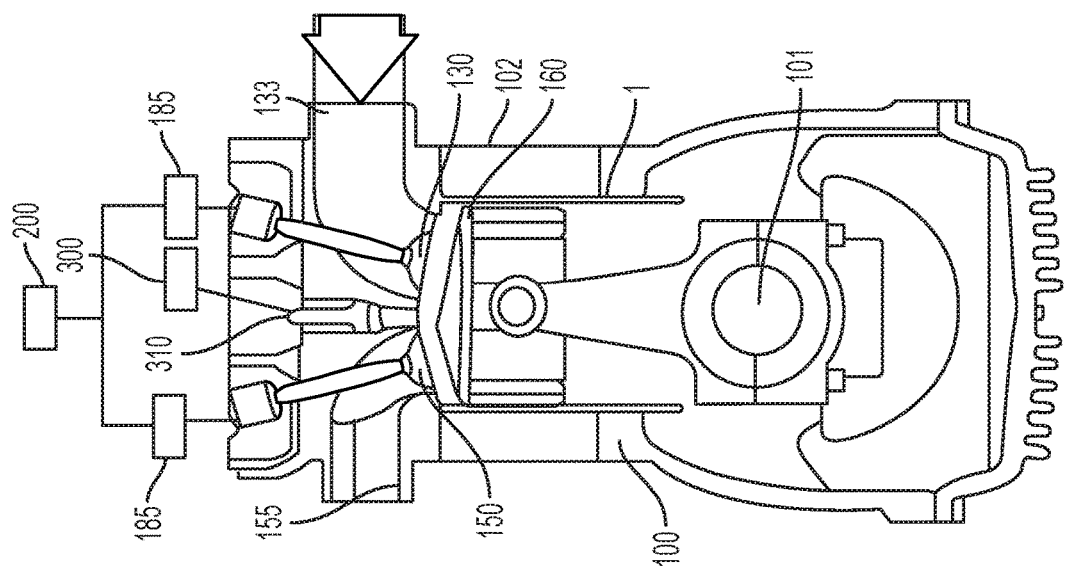
FIGS. 4A-4C show aspects of engine cylinders.
Figure 4A:
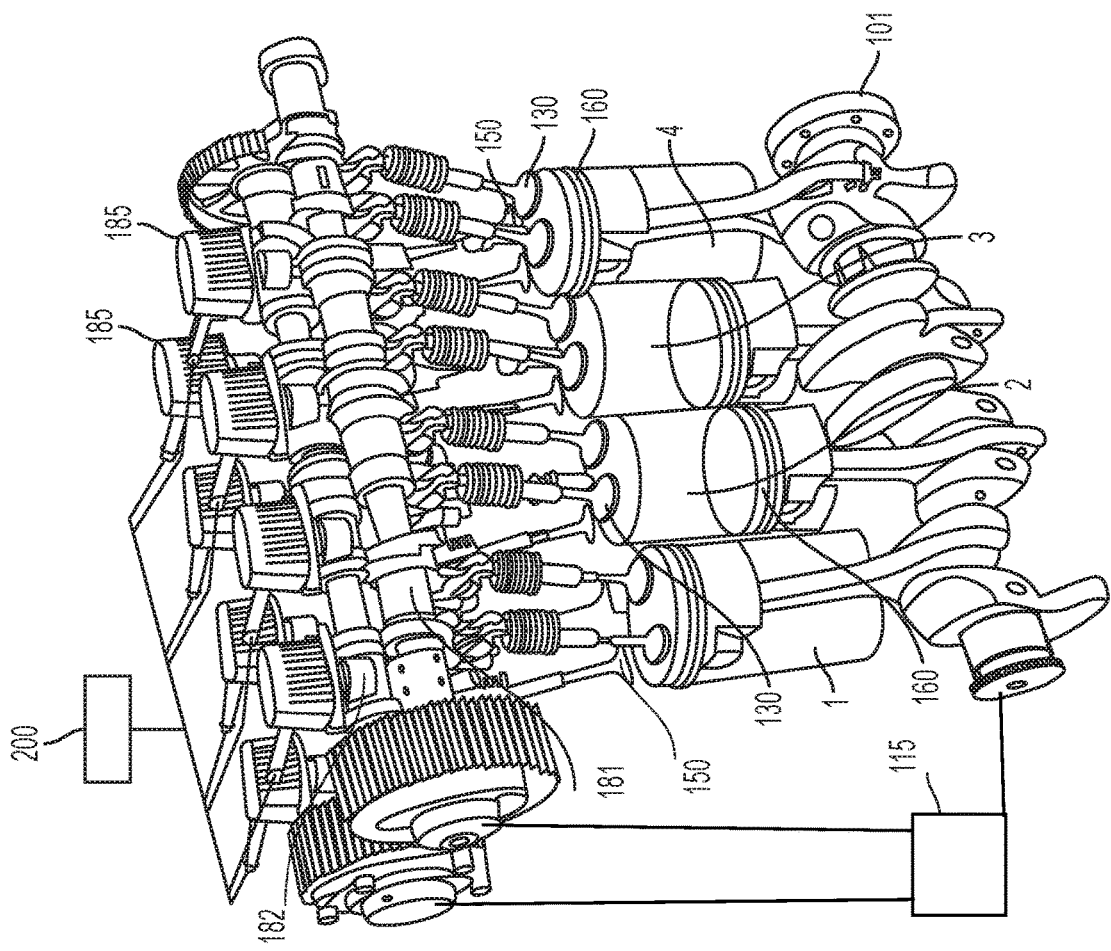

The engine 100 can be cam or camless, or a hybrid "cam-camless VVA." So, the intake and exhaust valves 130, 150 can either couple to a cam system for actuation, such as the camshafts 181, 182 example of FIG. 4A, a hydraulic rail, a latched rocker arm, other rocker arm, switching roller finger follower, lashed capsule, an electric actuator, a hydraulic actuator, or electro-hydraulic actuator, etc. For example, OEMs want engine braking at the same time that they want hydraulic lash adjustment. Few concepts can do both. It is possible to use a rocker arm lost motion capsule with reset to modularly perform HLA and braking. Other designs can include HLA and engine brake in a cam or camless engine.

As an alternative to that depicted, a camless direct acting mechanism can selectively operate the individual valves to open and close the cylinders.

Figure 4C:
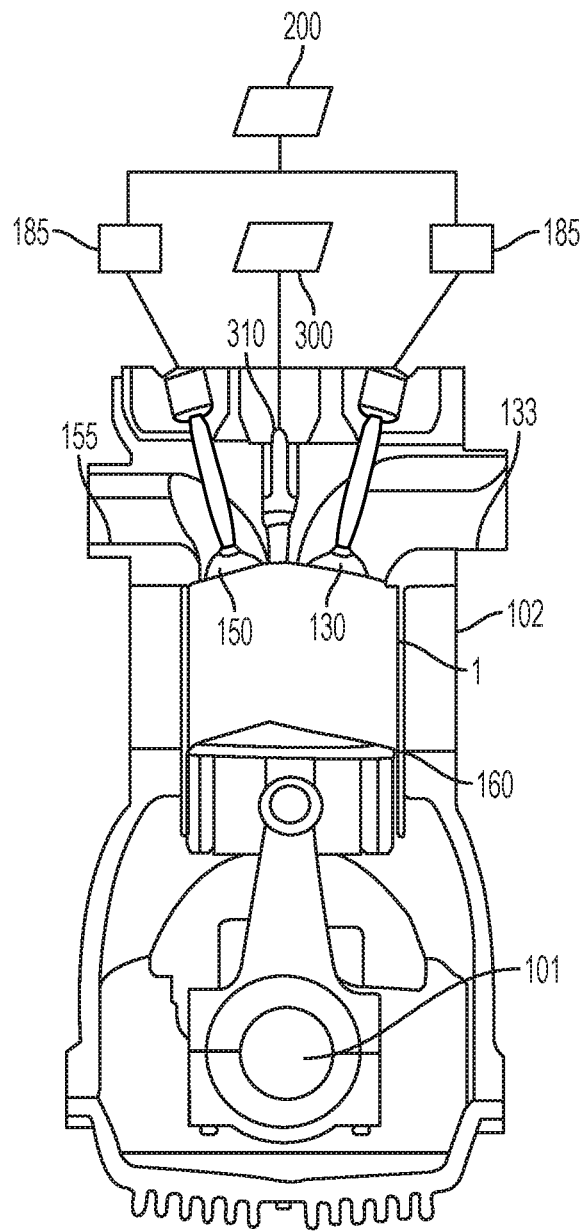

The crankshaft 101 can be coupled to transfer energy between the crankshaft 101 and the camshafts 181, 182 as by a torque transfer mechanism 115, which can comprise gear sets, belts, or other transfer mechanisms. While FIGS. 4B &4C show one intake valve 130 and one exhaust valve 150, it is possible to have two intake valves 130 and two exhaust valves 150 per each cylinder, as in FIG. 4A. The engine block 102 is removed for the example of FIG. 4A for clarity, and the cylinders are shown in broken lines.

A diesel engine works by compressing intake fluid in a cylinder 1-6 using a piston 160. Once the intake fluid has moved from the intake manifold 103 to the cylinder, it can be referred to as a "charge," and when the charge moves from the cylinder to the exhaust manifold 105, it can be referred to as exhaust.

In a combustion mode, fuel is injected via fuel injector 310. The high heat and compression ignites the fuel, and combustion forces the piston from top dead center (TDC) shown in FIG. 4B to bottom dead center (BDC) shown in FIG. 4C and torque is thereby directed to the crankshaft 101 for output on an affiliated flywheel. Diesel operation can be referred to as "4 stroke," though other operation modes such as 2-stroke, 6-stroke, and 8-stroke are possible and known in the art. In 4-stroke, the piston moves from TDC to BDC to fill the cylinder with intake fluid (stroke 1). The start of the cycle is shown in FIG. 4B, and FIG. 4C shows the end of stroke 1, when the cylinder is full of intake fluid. The piston rises back to TDC (stroke 2). Fuel is injected and ignites to push the piston 160 to BDC (stroke 3). The piston rises again to TDC to expel the exhaust out the exhaust valve (stroke 4). The intake valve 130 is open during stroke 1 and closed during strokes 2-4, though the VVA 200 can adjust the timing of opening and closing. The exhaust valve 150 is open during stroke 4 and closed during strokes 2-4, though the VVA 200 can adjust the timing of opening and closing. Compression occurs on the second stroke, and combustion occurs on the third stroke. 6-stroke and 8-stroke techniques include additional aspects of compression and injection after the intake valve has closed and prior to the exhaust valve opening. The application will discuss 4-stroke combustion techniques in detail, but where compatible, the 4-stroke combustion techniques can be applied to augment art-recognized 6-stroke or 8-stroke combustion techniques. 2-stroke engine-braking techniques can be used with 2-, 4-, 6- or 8-stroke combustion techniques.

Exhaust gases leave cylinders through exhaust ports 155 in engine block 102. Exhaust ports 155 communicate with an exhaust manifold 105. An exhaust manifold sensor 175 can monitor the pressure, flow rate, oxygen content, nitrous or nitric oxide (NOx) content, sulphur content, other pollution content or other qualities of the exhaust gas. Exhaust gas can power a turbine 510 of a variable geometry turbocharger (VGT) 501 or other turbocharger. The turbocharger 501 can be controlled via a turbocharger controller 500 to adjust a coupling 514 between the turbine 510 and the compressor 512. The VGT can be adjusted so as to control intake or exhaust flow rate or back pressure in the exhaust.

Exhaust gas is filtered in an aftertreatment system comprising catalyst 800. At least one exhaust sensor 807 is placed in the aftertreatment system to measure exhaust conditions such as tailpipe emissions, NOx content, exhaust temperature, flow rate, etc. A catalyst sensor 809 can be included to monitor specific aspects of temperature and content of the catalyst 800. The exhaust sensor 807 and catalyst sensor 809 can comprise more than one type of sensor, such as chemical, thermal, optical, resistive, velocity, pressure, etc. A sensor linked with the turbocharger 501 can also be included to detect turbine and compressor activity.

Exhaust can exit the system after being filtered by the at least one catalyst 800. Or, exhaust can be redirected to the intake manifold 103. An optional EGR cooler 455 is included. An EGR controller 400 actuates an EGR valve 410 to selectively control the amount of EGR supplied to the intake manifold 103. The exhaust recirculated to the manifold 103 impacts the air fuel ration (AFR) in the cylinder. Exhaust dilutes the oxygen content in the manifold 103. Unburned fuel from the fuel doser, or unburned fuel remaining after combustion increases the fuel amount in the AFR. Soot and other particulates and pollution gases also reduce the air portion of the air fuel ratio. While fresh air brought in through the intake system 700 can raise the AFR, EGR can lower AFR, and fuel injection to the cylinders can lower the AFR further. Thus, the EGR controller 400, fuel injection controller 300 and intake assist controller 600 can tailor the air fuel ratio to the engine operating conditions by respectively operating EGR valve 410, fuel injector 310, and intake assist device 610. So, adjusting the air fuel ratio to a firing cylinder can comprise one of boosting fresh air from intake system 700 to the at least one firing cylinder by controlling an intake air assist device 601, such as a supercharger, or decreasing air fuel ratio to a firing cylinder by boosting with exhaust gas recirculation to the firing cylinder. A charge air cooler 650 can optionally be included to regulate intake flow temperature. This can be done with or without augmenting with a turbocharger 501. Numerous alternative arrangements are possible for controlling air fuel ratio and other subcombinations and combinations of exhaust gas recirculation, turbocharging and supercharging are possible.

Additionally, terminating fuel injection to one or more cylinders 1-6 adjusts the air fuel ratio of exhaust gas, and deactivating a cylinder decreases the quantity of exhaust. Cylinder deactivation impacts the ability to power the turbine 510 to run the compressor 512. Implementing engine braking also impacts the quantity and composition of exhaust gasses. Altering the pressure and temperature of fluid exiting the cylinder also impacts the harmonics of the engine system.

Figure 1:
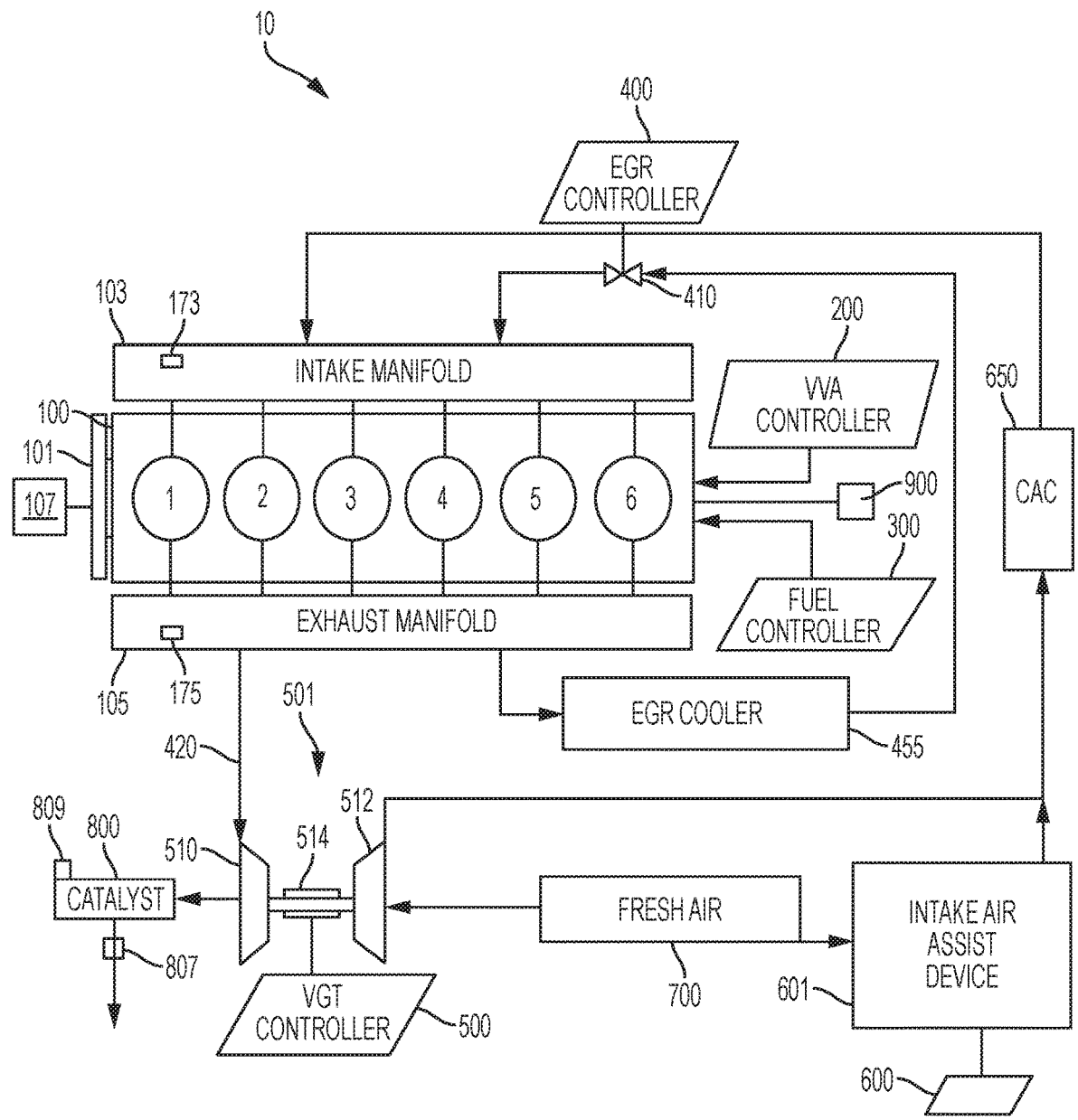
FIG. 1 is a schematic for an engine system.
Figure 2:
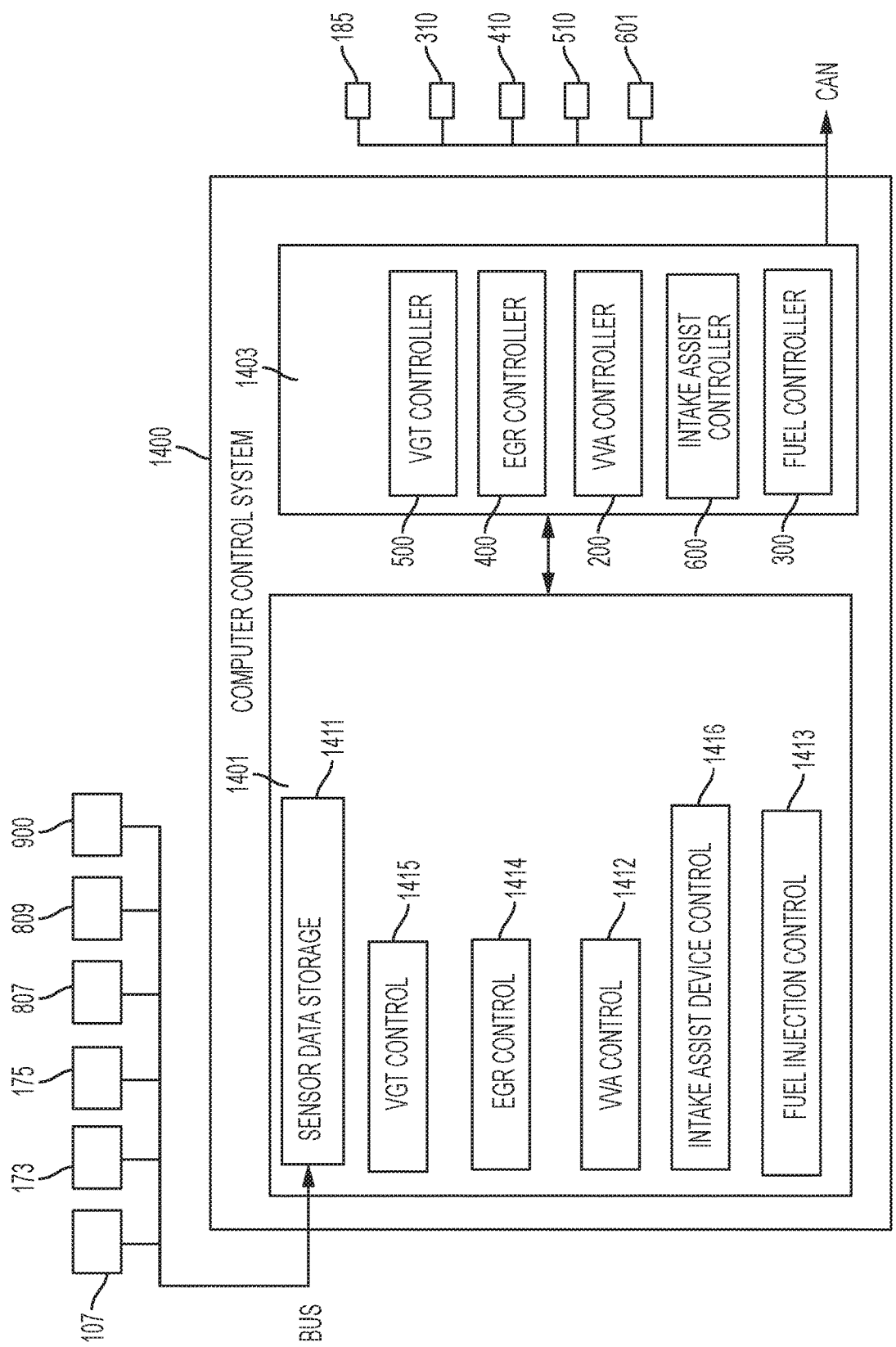
FIG. 2 is a schematic for a control system.

A computer control network is outlined in FIG. 2, and is connected to fuel injector 310 of fuel injection system and valve actuators 185 for respective intake valves and respective exhaust valves. When included, the computer control system is connected to optional EGR valve 410, variable geometry turbine 510, and intake assist device 601. The network can comprise a BUS for collecting data from various sensors, such as crankshaft sensor 107, intake manifold sensor 173, exhaust manifold sensor 175, exhaust sensor 807, catalyst sensor 809, user input sensor 900, etc. The sensors can be used for making real-time adjustments to the fuel injection timing and quantity and valve opening and closing timing. Additional functionality can be pre-programmed and stored on the memory device 1401. The additional functionality can comprise pre-programmed thresholds, tables, and other comparison and calculation structures for determining power settings for the cylinders, durations for the power settings and number and distribution cylinders at particular power settings. For example, a sensed vehicle start up selection, accessory selection, gear selection, load selection or other sensor feedback can indicate that an exhaust temperature is or will be too low. In addition to temperature thresholds for entering and exiting thermal management strategies, it is possible to apply load thresholds. Load thresholds are particularly useful for determining the power setting aspects outlined below, though it is possible to provide real-time calculations via the computer controller 1400.

Memory device 1401 is a tangible readable memory structure, such as RAM, EPROM, mass storage device, removable media drive, DRAM, hard disk drive, etc. Signals per se are excluded. The algorithms necessary for carrying out the methods disclosed herein are stored in the memory device 1401 for execution by the processor 1403. When optional variable geometry turbocharger control is implemented, the VGT control 1415 is transferred from the memory 1401 to the processor for execution, and the computer control system functions as a turbocharger controller. Likewise, the computer control system 1400 implements stored algorithms for EGR control 1414 to implement an EGR controller 400; implements stored algorithms for intake assist device control 1416 to implement intake assist controller 600; and implements stored algorithms for fuel injection control 1413 to implement fuel injection controller 300. When implementing stored algorithms for VVA control 1412, various intake valve controller and exhaust valve controller strategies are possible relating to valve timing and valve lift strategies, as detailed elsewhere in this application, and these strategies can be implemented by VVA controller 200. A controller area network (CAN) can be connected to appropriate actuation mechanisms to implement the commands of the processor 1403 and various controllers.

While the computer control system 1400 is illustrated as a centralized component with a single processor, the computer control system 1400 can be distributed to have multiple processors, or allocation programming to compartmentalize the processor 1403. Or, a distributed computer network can place a computer structure near one or more of the controlled structures. The distributed computer network can communicate with a centralized computer control system or can network between distributed computer structures. For example, a computer structure can be near the turbocharger 501 for VGT control 500, another computer structure can be near the EGR valve 410 for EGR controller 400, another computer structure can be near the intake and exhaust valves for variable valve actuator 200, yet another computer controller can be placed for fuel injection controller 300, and yet another computer controller can be implemented for intake assist controller 600. Subroutines can be stored at the distributed computer structures, with centralized or core processing conducted at computer control system 1400.

The computer network comprises the processor 1403, at least one tangible memory device 1401, and processor-executable control algorithms for implementing the methods disclosed herein stored in the memory device 1401 and executable by the processor 1403. The stored processor-executable control algorithms implement the disclosed methods.

On diesel engines with an aftertreatment system, fast light-off is important. Light-off refers to the activation of the catalyst 800 or the reaction of oxidized or vaporized fuel with the catalyst 800. It is desirable to have the time to achieve light-off temperature be independent of the operating conditions, specifically the engine output power setting. No matter what load, it is desirable that the aftertreatment efficiently handle pollution. Generally the shortest time to light-off is at close to engine stoichiometric operation and engine maximum power operation. However, this operation mode is not where many vehicles spend the majority of their operating life. So, conveying this efficiency benefit to other operation modes is desired.

At low engine power settings this can be accomplish by running a given number NC of the cylinders 1-6 at an optimal power setting in a combustion mode and braking the engine with the other cylinders (NB) to control the engine output power to its desired value. Powered-Braking is the term used to describe this type of operating condition. In the example of FIGS. 3B & 3D, the number of cylinders in combustion mode is NC=3. And, the number of cylinders braking is switchable to NB=3. In FIG. 3D, the number of cylinders in deactivated mode is switchable to ND=3. As outlined in more detail below, the numbers of cylinders designated for the given modes can vary based on the design of the engine. Any number of the cylinders can be designed for thermal management techniques of cylinder deactivation or engine braking, from a single cylinder switchable between two modes, to one cylinder switchable between all three modes, to all of the cylinders are switchable between all three modes.

It is convenient to use "powered braking" to refer to the condition where at least one cylinder is firing in combustion mode and at least one cylinder is performing engine braking for thermal management purposes. As above the designated cylinder for performing engine braking can be static or can be switched among cylinders enabled to go between combustion, braking and deactivated modes. "Skip braking" can be used to refer to changing one or more engine braking cylinders to another one, or set of, cylinder at selected revolutions of the crankshaft 101. Put another way, "powered braking" is operating a diesel engine where one or more of the cylinders, of a multi-cylinder engine, operate at a power level while the remaining cylinders operate in compression release braking (CRB) mode.

Compression release braking (CRB) is "engine braking" and is a technique to remove torque from the crankshaft. To remove torque, the exhaust valve 150, or an optional 5th valve, is opened in the compression stroke. The opening occurs after the piston 160 leaves bottom-dead-center, and at or near the piston 160 reaching top-dead-center. Fuel to the braking cylinder is typically cut off. Engine braking is typically done to remove torque from the crankshaft 101 to brake a vehicle, aiding in slowing down the vehicle, and supplementing the wheel brakes of the vehicle. In this application, engine braking is applied to exhaust temperature management and can be applied to harmonics management, thus broadening the applicability of the technique. Powered braking techniques expand the application of engine braking to non-emergency situations.

Powered braking is referenced for the new techniques of applying the compression stroke to the non-braking operating conditions. "Compression Release Braking" (CRB) permits the strategic heating of charge air in a cylinder. Releasing the compressed charge can heat the aftertreatment for good light-off, or can balance engine harmonics, or negate torsionals in the driveshaft. Powered braking can be used during traditional braking events, but the term encompasses more than traditional stopping of a vehicle to encompass thermal, fuel efficiency, and fuel economy aspects.

Compression release braking can further comprise opening the intake valve 130. Traditional engine braking utilizes a special "5th valve" or the exhaust valve 150, but thermal management techniques can comprise managing the temperature of the intake manifold 103. So, it is possible to direct compressed air to the intake manifold by opening the intake valve 130. Still further, it is possible to charge a pressurized tank with the released compressed air. The pressurized tank can be used, for example, for auxiliary braking.

Traditional engine braking terminates fuel to the cylinder, but it is possible to implement powered braking techniques where some fuel is injected into the cylinder during the compression stroke. On engines that terminate fuel during braking mode the maximum pressure generated during braking is directly proportional to the compression ratio of the cylinder. If fuel was injected some time, usually early, in the compression stroke, higher pressures could be generated in the cylinder. This would provide a greater amount of braking to the vehicle and would be only limited by the force available to open up the exhaust valve 150 at approximately TDC (top dead center). Injecting some fuel in to the cylinder permits further tailoring of the power setting for the engine, including tailoring the net torque output of the crankshaft 101, and tailoring the torque removed from the crankshaft 101 by the braking cylinder. Also, the heat management techniques benefit from the ability to tailor the heat of the compression release braking technique.

Turning to brake thermal efficiency (BTE) considerations, the firing cylinders output more than 0% power up to 100% power. The closer to 100% power the cylinder fires at, the better the brake thermal efficiency (BTE) for that cylinder. A high BTE for a cylinder means the output exhaust is a higher temperature, which is good for capturing pollution in the catalyst 800. But, using only the fuel necessary for the operating conditions is good for fuel economy, and so tradeoffs exist to select the power level for the cylinder. So, it is possible to implement control strategies to control the number of cylinders firing, the power output of those firing cylinders, and the number of cylinders in CRB. As one example, some cylinders can fire with high BTE for catalyst heat control, while other cylinders fire with optimal power output for the conditions for delivering power to the machine attached to the engine, while yet other cylinders are in CRB to support catalyst heat control or to balance harmonics. Several strategies are outlined below.

Figure 5:
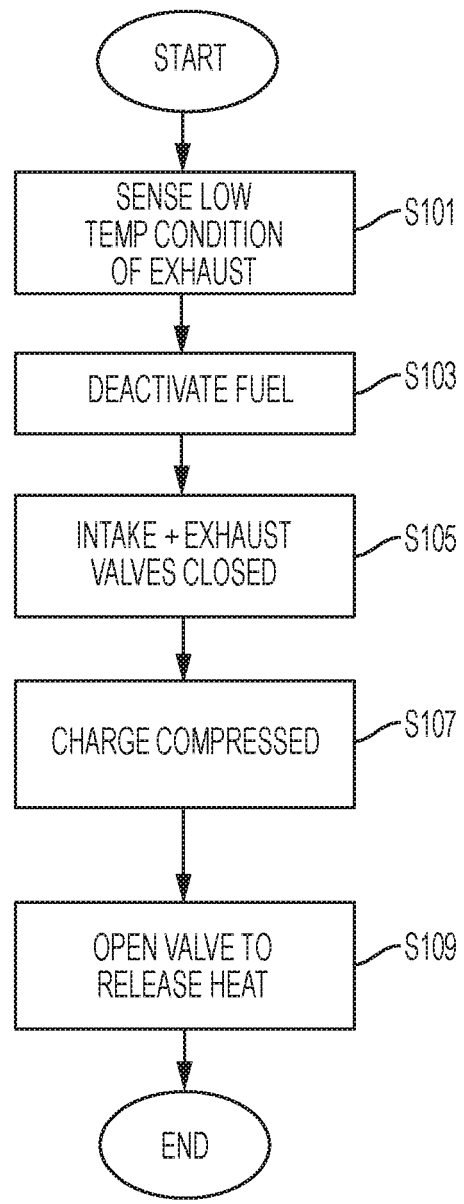
FIGS. 5-7 show flow diagrams for engine system management.

One method for exhaust temperature management in a multiple-cylinder, reciprocating-piston engine is shown in FIG. 5. In step S101, the method comprises sensing a low temperature condition of the exhaust. Based on the sensed low temperature condition, the engine computer control system 1400 implements an increased heat output engine cycle pattern for the engine 100. The increased heat output engine cycle pattern comprises deactivating fuel injection to at least a first cylinder of the engine in step S103. The first cylinder comprises a piston 160 reciprocating between top-dead-center and bottom-dead-center. The intake valve 130 and exhaust valve 150 can be closed for the first cylinder in step S105. The reciprocating piston 160 compresses the charge in the cylinder in step S107. After compression, one or both of the intake valve 130 and the exhaust valve 150 are opened to release heat in step S109. Step S109 can comprise engine-braking or activating a deactivated cylinder.

Figure 6:
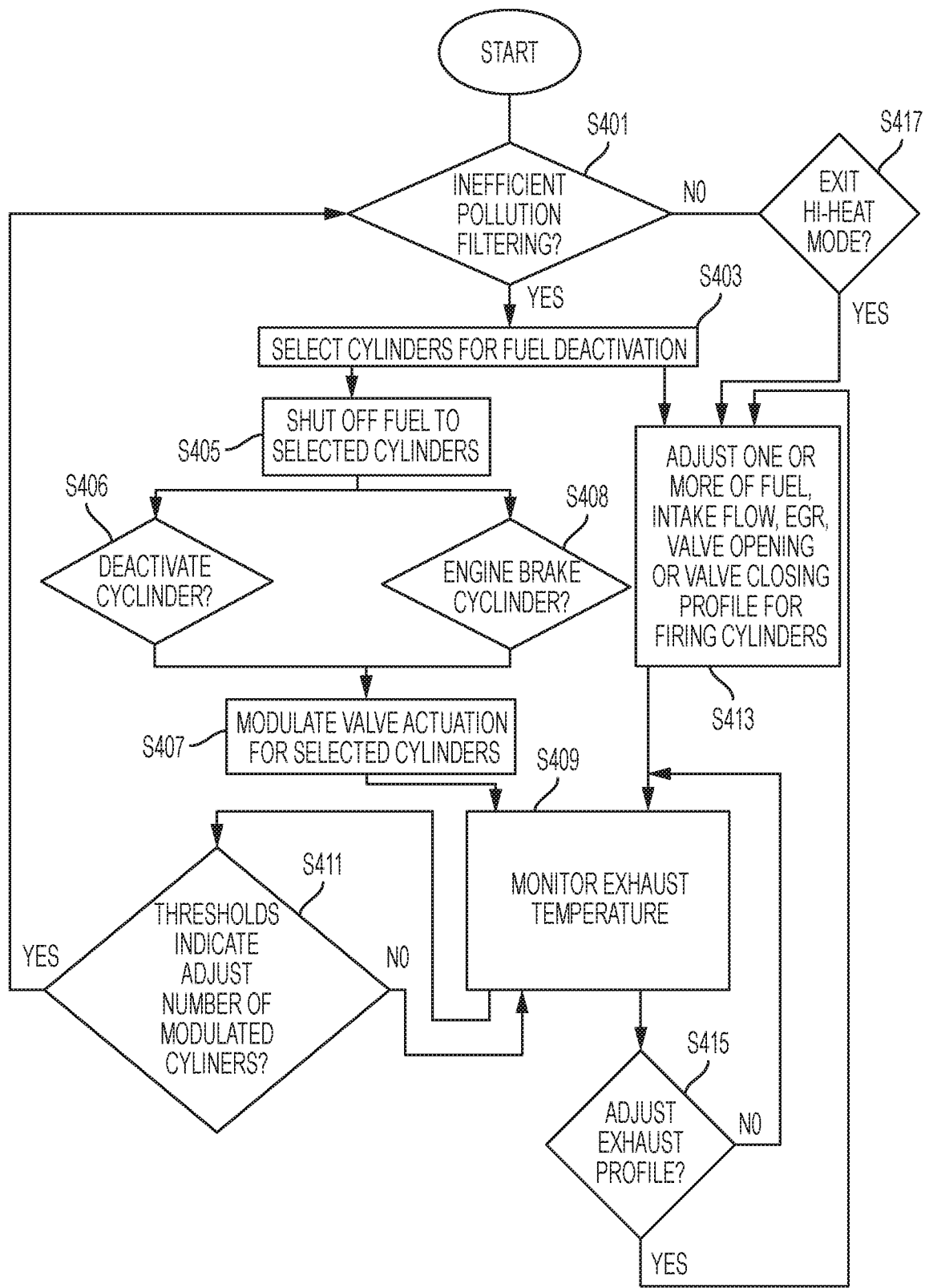

An alternative method is outlined in FIG. 6. Step S401 determines whether pollution filtering of the exhaust is being done efficiently. If filtering is sufficiently efficient, then there is no need for high heat mode, and a decision can be made whether to exit a high-heat mode in step S417. But, if pollution filtering is inefficient, decisions can be made as to whether the exhaust is too low of a temperature for efficient pollution capture, or whether other aspects of the engine system are resulting in poor catalyst action, such as no urea in a urea doser, or such as malfunction of another system component. This can comprise taking a temperature reading from one or more of intake manifold sensor 173, exhaust manifold sensor 175, tailpipe exhaust sensor 807, catalyst sensor 809 or another sensor that indicates the content or thermal attributes of the exhaust. Intake manifold sensor 173 is useful for knowing whether to boost the intake manifold to adjust the exhaust 420. Using thermodynamic principles relating pressure, volume and temperature, computer control or pre-programming can assist with determining when exhausting to the intake manifold 103 will improve the exhaust in the next cycle. It can be beneficial to include additional sensors for boosting devices, such as turbines, compressors, EGR devices, etc. to determine other ways to adjust the exhaust 420. For example, knowing the speed of the intake air assist device 601 can be used to determine whether further boosting is possible, or whether air to fuel ratio (AFR) should be adjusted via fueling instead of boosting, as when the intake air assist device 601 is operating at or near on operational limit. Likewise, when a turbocharger 501 is included, sensor data can be used to determine operational limits for adjusting the exhaust 420 via the turbocharger. Numerous alternatives for determining the temperature and content of the exhaust 420, and techniques for calculating how to improve the temperature and content of the exhaust can be made without departing from the scope of the disclosure.

If the catalyst 800 and other aftertreatment mechanisms are not operating efficiently to filter pollution, the computer controller 1400 selects cylinders for fuel deactivation in step S403. In parallel, the computer controller can determine whether other adjustments will increase exhaust temperature such as fuel quantity to combustion cylinders, boosting or otherwise adjusting the intake flow, adjusting a quantity of EGR gases, adjusting valve timing for firing cylinders, etc. It is important to eliminate the power jerk coming in and out of thermal management techniques such as CDA mode and engine-braking mode. And, the boosting system also follows cues: Timing and prompting of the boosting system is a factor to consider. The engine system will be turning air boosting on and off. A steady state will have more predictable air flow parameters, and an acceleration could have a boost delay. The boost lag versus instantaneous thermal management implementations prompt timing calibrations.

Adjusting valve timing can comprise Early Intake Valve Opening (EIVO), Early Intake Valve Closing (EIVC), Late Intake Valve Opening (LIVO), Late Intake Valve Closing (LIVC), Early Exhaust Valve Opening (EEVO), Early Exhaust Valve Closing (EEVC), Late Exhaust Valve Opening (LEVO), Late Exhaust Valve Closing (LEVC), a combination of intake valve actuation timing and exhaust valve actuation timing, such as EEVC with LIVO, or adjustments such as (Negative Valve Overlap (NVO)). Computer controller 1400 can likewise make the determinations of step S413 when exiting high-heat mode to maintain the aftertreatement temperature at the appropriate level, to maintain the overall engine power setting at the appropriate level while turning off engine-braking or adjusting deactivated cylinders. Step S413 is useful for preventing jerks in operability and other inconveniences to the user. Step S413 can be returned to when the exhaust profile indicates that adjustments are necessary in S415, or when it is possible to exit high-fuel use settings in favor of lower fuel use settings.

So, part of step S403 is determining how many cylinders, NC, should remain firing in combustion mode. The desired engine power setting dictates how many cylinders, NC, remain firing in combustion mode as outlined in more detail below.

Fuel is shut off to the cylinders selected for fuel deactivation in step S405. A determination can be made at steps S406 and S408, or earlier as part of step S403, as to which cylinders should be deactivated in cylinder deactivation mode or put in engine-braking mode.

Activating engine braking mode on one or more first cylinders (NB) can be achieved by opening one or more valves when the piston 160 is away from bottom-dead-center during a compression stroke. At least a second cylinder (NC) of the engine is fired in a combustion mode while the first cylinder is in engine braking mode. This can be achieved as in step S407 by modulating the valve actuator 185, 1185, 2185 for the selected number of engine-braking cylinders NB, the selected number of combustion mode cylinders NC, and the selected number of cylinder deactivation mode cylinders ND.

Monitoring exhaust temperature in step S409 can be done in support of other decisions, such as whether to adjust the exhaust content and temperature profiles in decision step S415, or whether temperature thresholds, such as lines 50 and 60, or points A-E & R, indicate the necessity to adjust the number NC, ND, & NB of modulated cylinders in step S411. These decisions can lead to iterating a selected cylinder pattern for another engine cycle or whether to loop back to the decisions made to ameliorate inefficient pollution filtering in step S401.

In an additional aspect, firing cylinders can, but are not required to, have identical power outputs. Firing cylinders can have dissimilar power outputs, so that one or more cylinders have high brake thermal efficiency (BTE) while other firing cylinders have good fuel economy. The closer a cylinder fires to stoichiometric air to fuel ratio (AFR), the better the fuel efficiency, and so selecting the distribution and number of firing versus CRB cylinders can also be based on a fuel efficient power output, with a uniform or diverse distribution of fuel efficiencies among firing cylinders. A net torque output (NTO) from the engine provides power to the affiliated machinery.

In another aspect, powered braking can be operated under steady state conditions or dynamic conditions. By varying the cylinders activated, it is as if the engine is two engines: a free-running engine and a braking engine. For steady state conditions, a given number of cylinders are braking and the remaining cylinders are outputting power. The cylinders can be operated under this mode for an extended period of time or many engine revolutions. See the example of this in Table 1 below.

Table 1 shows the condition where compression release braking (CRB) is used in conjunction with cylinders running at a selected power level. The number of cylinders at 100% power output due to firing in combustion mode varies from NC=0 to 6. The number of cylinders in engine-braking mode (CRB) varies from NB=0 to 6. This example uses a 6 cylinder engine where each cylinder, when under power, produces 50 horsepower (Hp) and where maximum engine braking produces 40 Hp per cylinder. There are seven power levels available under steady state conditions.

TABLE 1

| Hp | Max$_P$-CRB$_P$ | Cylinder #1 | Cylinder #2 | Cylinder #3 | Cylinder #4 | Cylinder #5 | Cylinder #6 |
|---|---|---|---|---|---|---|---|
| 300 | 300-0 | 100% | 100% | 100% | 100% | 100% | 100% |
| 210 | 250-40 | CRB | 100% | 100% | 100% | 100% | 100% |
| 120 | 200-80 | CRB | CRB | 100% | 100% | 100% | 100% |

TABLE 1-continued

| Hp | Max$_P$-CRB$_P$ | Cylinder #1 | Cylinder #2 | Cylinder #3 | Cylinder #4 | Cylinder #5 | Cylinder #6 |
|---|---|---|---|---|---|---|---|
| 30 | 150-120 | CRB | CRB | CRB | 100% | 100% | 100% |
| −60 | 100-160 | CRB | CRB | CRB | CRB | 100% | 100% |
| −150 | 50-200 | CRB | CRB | CRB | CRB | CRB | 100% |
| −240 | 0-240 | CRB | CRB | CRB | CRB | CRB | CRB |

Under dynamic conditions, a given number of cylinders are braking ($N_B$=0 to 6) and the remaining cylinders are outputting power ($N_C$=0 to 6). All of these cylinders operate under this mode for only one engine cycle. An engine cycle is 2 engine revolutions, except for single cycle (one stroke) engines. In the next engine cycle, another set of cylinders are braking and the remaining cylinders are outputting power. This pattern can be repeated over a given period of time. The pattern can be selected to balance engine vibrations or other harmonics, in addition to the BTE, fuel efficiency, and fuel economy aspects above. Two examples of this skip braking technique are given in Tables 26 below.

Compression release braking (CRB) is used in conjunction with cylinders running at power. For a 6 cylinder engine, where each cylinder when under power produces 50 Hp, and where maximum engine braking produces 40 Hp per cylinder, there are six power levels available under dynamic switching conditions, only 3 of which are different power levels different from the steady state condition. Dynamic switching is switching, from cycle to cycle, from full power, or some power level, on a given cylinder to full braking on that same given cylinder.

Table 2 comprises a two cylinder cycle pattern. Two cylinders are braking ($N_B$=2), but are dynamically moving to different cylinders every other revolution. Four cylinders are firing in combustion mode ($N_C$=4). It is as if there are two engines available: one with a 300 Hp output and a second engine with a 120 Hp output. The average output power for the example of Table 2 is =210 Hp.

TABLE 2

| | Hp | Cylinder #1 | Cylinder #2 | Cylinder #3 | Cylinder #4 | Cylinder #5 | Cylinder #6 |
|---|---|---|---|---|---|---|---|
| Cycle 1 | 300 | 100% | 100% | 100% | 100% | 100% | 100% |
| Cycle 2 | 120 | CRB | CRB | 100% | 100% | 100% | 100% |
| Cycle 3 | 300 | 100% | 100% | 100% | 100% | 100% | 100% |
| Cycle 4 | 120 | 100% | 100% | 100% | CRB | CRB | 100% |
| Cycle 5 | 300 | 100% | 100% | 100% | 100% | 100% | 100% |
| Cycle 6 | 120 | 100% | CRB | CRB | 100% | 100% | 100% |
| Cycle 7 | 300 | 100% | 100% | 100% | 100% | 100% | 100% |
| Cycle 8 | 120 | 100% | 100% | 100% | 100% | CRB | CRB |

There are many different switching patterns available but in the example of Table 3, there are 6 possible horsepower options by cycling between a first pattern of combustion mode cylinders ($N_C$=$X_1$) and engine-braking cylinders ($N_B$=$Y_1$) on a first cycle and a second pattern of combustion mode cylinders ($N_C$=$X_2$) and engine-braking cylinders ($N_B$=$Y_2$) on a second cycle. By extending the number of cylinders beyond the steady state use of two cylinders, there are 3 additional power settings available shown in bold in Table 3. Cylinders reverse between 100% stoichiometric combustion mode and engine-braking mode, and there are two of these per cycle.

TABLE 3

| $N_B$ for every 2 engine cycles | 2 Reversals per Cycle | Hp Calculation | Average Hp |
|---|---|---|---|
| Switching $N_B$ from 0 to 1 cylinders | 100%⇔CRB | (300 + 210)/2 | 255 |
| Switching $N_B$ from 0 to 2 cylinders | 100%⇔CRB | (300 + 120)/2 | 210 |
| Switching $N_B$ from 0 to 3 cylinders | 100%⇔CRB | (300 + 30)/2 | 165 |
| Switching $N_B$ from 0 to 4 cylinders | 100%⇔CRB | (300 − 60)/2 | 120 |
| Switching $N_B$ from 0 to 5 cylinders | 100%⇔CRB | (300 − 150)/2 | 75 |
| Switching $N_B$ from 0 to 6 cylinders | 100%⇔CRB | (300 − 240)/2 | 30 |

In Table 4, the cylinders are distributed in to a pattern that effectively creates three engines: one with a first pattern of combustion mode cylinders ($N_C=X_3$) and engine-braking cylinders ($N_B=Y_3$) on a first cycle, a second pattern of combustion mode cylinders ($N_C=X_4$) and engine-braking cylinders ($N_B=Y_4$) on a second cycle, and a third pattern of combustion mode cylinders ($N_C=X_5$) and engine-braking cylinders ($N_B=Y_5$) on a third cycle. The cylinders selected for combustion mode and the cylinders selected for compression release braking (CRB) can vary among the cycles.

In Table 4, all cylinders are firing in combustion mode on the first engine cycle comprising 2 engine revolutions ($N_C=6$). Two cylinders are engine-braking mode ($N_B=2$) and four cylinders are firing in combustion mode ($N_C=4$) on the second cycle. Four cylinders are engine-braking ($N_B=4$) and two cylinders are in combustion mode ($N_C=2$) on the third cycle. The cylinders that are engine-braking dynamically move every three engine cycles. The average output power is equal to 87 Hp.

TABLE 4

|  | Hp | Cylinder #1 | Cylinder #2 | Cylinder #3 | Cylinder #4 | Cylinder #5 | Cylinder #6 |
|---|---|---|---|---|---|---|---|
| Cycle 1 | 300 | 100% | 100% | 100% | 100% | 100% | 100% |
| Cycle 2 | 120 | CRB | CRB | 100% | 100% | 100% | 100% |
| Cycle 3 | −60 | CRB | CRB | 100% | CRB | CRB | 100% |
| Cycle 4 | 300 | 100% | 100% | 100% | 100% | 100% | 100% |
| Cycle 5 | 120 | 100% | 100% | 100% | CRB | CRB | 100% |
| Cycle 6 | −60 | CRB | CRB | 100% | CRB | CRB | 100% |
| Cycle 7 | 300 | 100% | 100% | 100% | 100% | 100% | 100% |
| Cycle 8 | 120 | 100% | CRB | CRB | 100% | 100% | 100% |
| Cycle 9 | −60 | 100% | CRB | CRB | 100% | CRB | CRB |

There are many different switching patterns available but there are only a few possible horsepower options using this strategy for effectively creating more than one engine via adjusting the power setting for the engine. There are 8 additional power settings available beyond the steady state 2-cycle dynamic options shown in bold in Table 5. Cylinders are configured to switch between 100% stoichiometric combustion mode and engine-braking mode, and there are three of these reversals between modes per cycle.

TABLE 5

| $N_B$ for every 3 engine cycles | 3 Reversals per Cycle | Hp Calculation | Avgerage Hp |
|---|---|---|---|
| Switching $N_B$ from 0 to 0 to 1 cylinder | 100%⇔100%⇔CRB | (300 + 300 + 210)/3 | 270 |
| Switching $N_B$ from 0 to 0 to 2 cylinders | 100%⇔100%⇔CRB | (300 + 300 + 120)/3 | 240 |
| Switching $N_B$ from 0 to 0 to 3 cylinders | 100%⇔100%⇔CRB | (300 + 300 + 30)/3 | 210 |
| Switching $N_B$ from 0 to 0 to 4 cylinders | 100%⇔100%⇔CRB | (300 + 300 − 60)/3 | 180 |
| Switching $N_B$ from 0 to 0 to 5 cylinders | 100%⇔100%⇔CRB | (300 + 300 − 150)/3 | 150 |
| Switching $N_B$ from 0 to 0 to 6 cylinders | 100%⇔100%⇔CRB | (300 + 300 − 240)/3 | 120 |
| Switching $N_B$ from 0 to 1 to 1 cylinder | 100%⇔CRB%⇔CRB | (300 + 210 + 210)/3 | 240 |
| Switching $N_B$ from 0 to 1 to 2 cylinders | 100%⇔CRB%⇔CRB | (300 + 210 + 120)/3 | 210 |
| Switching $N_B$ from 0 to 1 to 3 cylinders | 100%⇔CRB%⇔CRB | (300 + 210 + 30)/3 | 180 |
| Switching $N_B$ from 0 to 1 to 4 cylinders | 100%⇔CRB%⇔CRB | (300 + 210 − 60)/3 | 150 |
| Switching $N_B$ from 0 to 1 to 5 cylinders | 100%⇔CRB%⇔CRB | (300 + 210 − 150)/3 | 120 |
| Switching $N_B$ from 0 to 1 to 6 cylinders | 100%⇔CRB%⇔CRB | (300 + 210 − 240)/3 | 90 |
| Switching $N_B$ from 0 to 2 to 6 cylinders | 100%⇔CRB%⇔CRB | (300 + 210 − 150)/3 | 60 |
| Switching $N_B$ from 0 to 5 to 6 cylinders | 100%⇔CRB%⇔CRB | (300 + 210 − 240)/3 | −30 |

The above principles can be applied to have powered braking and non-powered braking. This entails operating a diesel engine where one or more of the cylinders 1-6, operate at a power level while one or more of the other cylinders operate in compression release braking mode and the remaining cylinders operate in cylinder deactivation (CDA) mode. Cylinder deactivation (CDA) mode is where the intake valve, exhaust valve, and fuel injection are shut off for a selected cylinder cycle.

Figure 8:
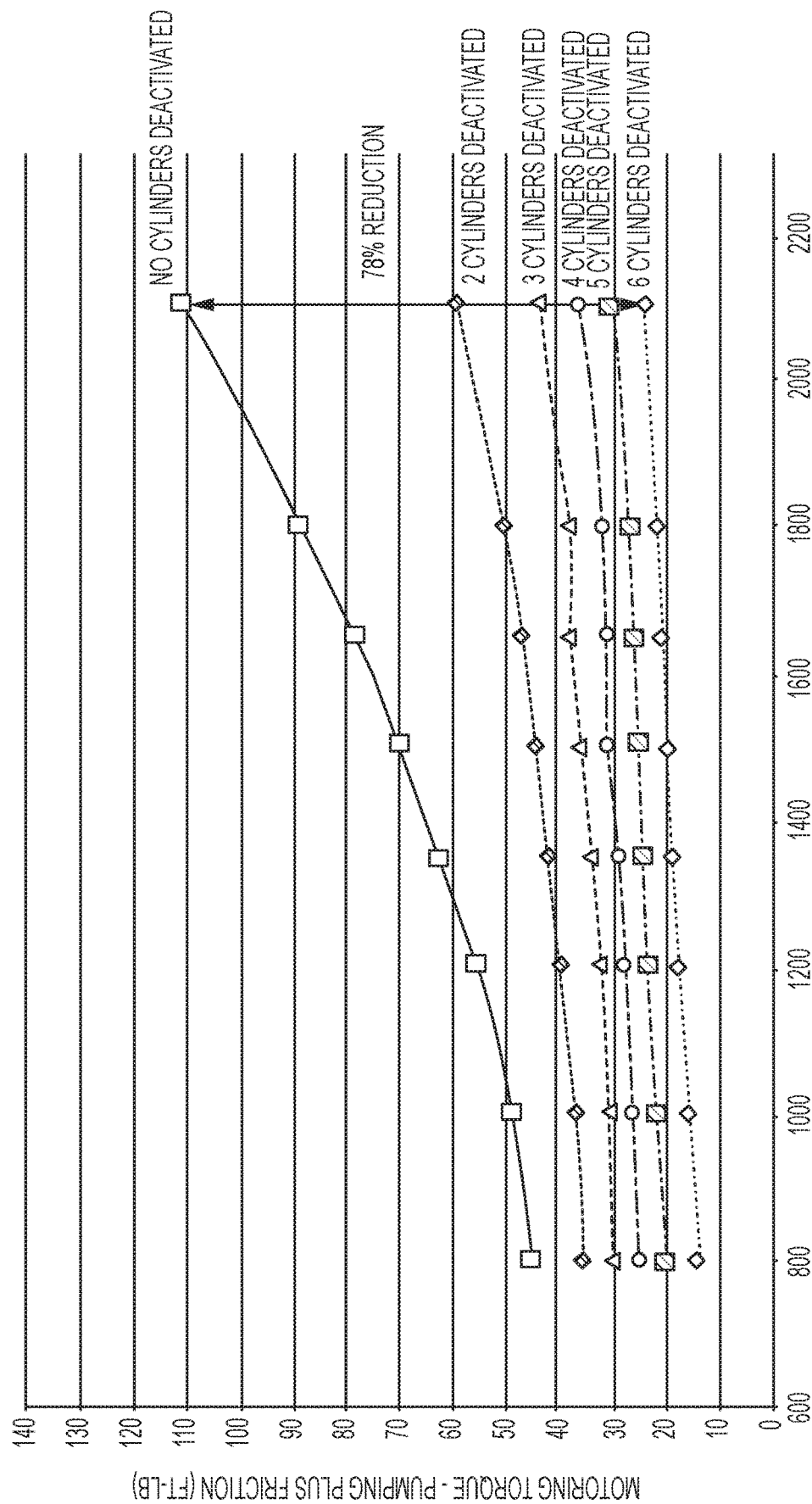
FIG. 8 shows aspects of motoring torque variations caused by friction variations as a function of cylinder deactivation and engine speed.

Cylinder deactivation yields additional energy savings benefits. For example, FIG. 8 shows an example where different numbers of cylinders of a 6-cylinder engine are deactivated for a range of engine speeds (rotations per minute, or RPM). The example engine requires a certain amount of energy to turn the crankshaft 101 at all. The valvetrain housing the intake valves 130 and exhaust valves 150, the valve actuators 185, 1185, 2185, the pistons, certain accessories, all require energy from the crankshaft 101 when the cylinders are all in combustion mode. By reducing the number of cylinders in combustion mode ($N_C$), and increasing the number of cylinders in cylinder deactivation mode ($N_O$), the amount of burden on the crankshaft 101 is reduced. Instead of 110 foot-pounds of torque necessary to power all cylinders at 2100 RPM, pumping plus friction torque energy requirements are reduced by up to 78% by deactivating cylinders. Maximum savings occurs when the engine 100 is coasting in all-cylinders deactivated mode. So, by varying the number of cylinders deactivated ($N_D$=0 to 6), significant fuel economy benefits are achieved. And, capturing a charge in the deactivated cylinder generates heat for thermal management aspects. So, it is possible to improve the brake thermal efficiency (BTE) of the combustion mode cylinders ($N_C$), achieve high heat with engine-braking mode ($N_B$), and reduce fuel consumption and raise heat via cylinder deactivation mode ($N_D$).

Figure 9:
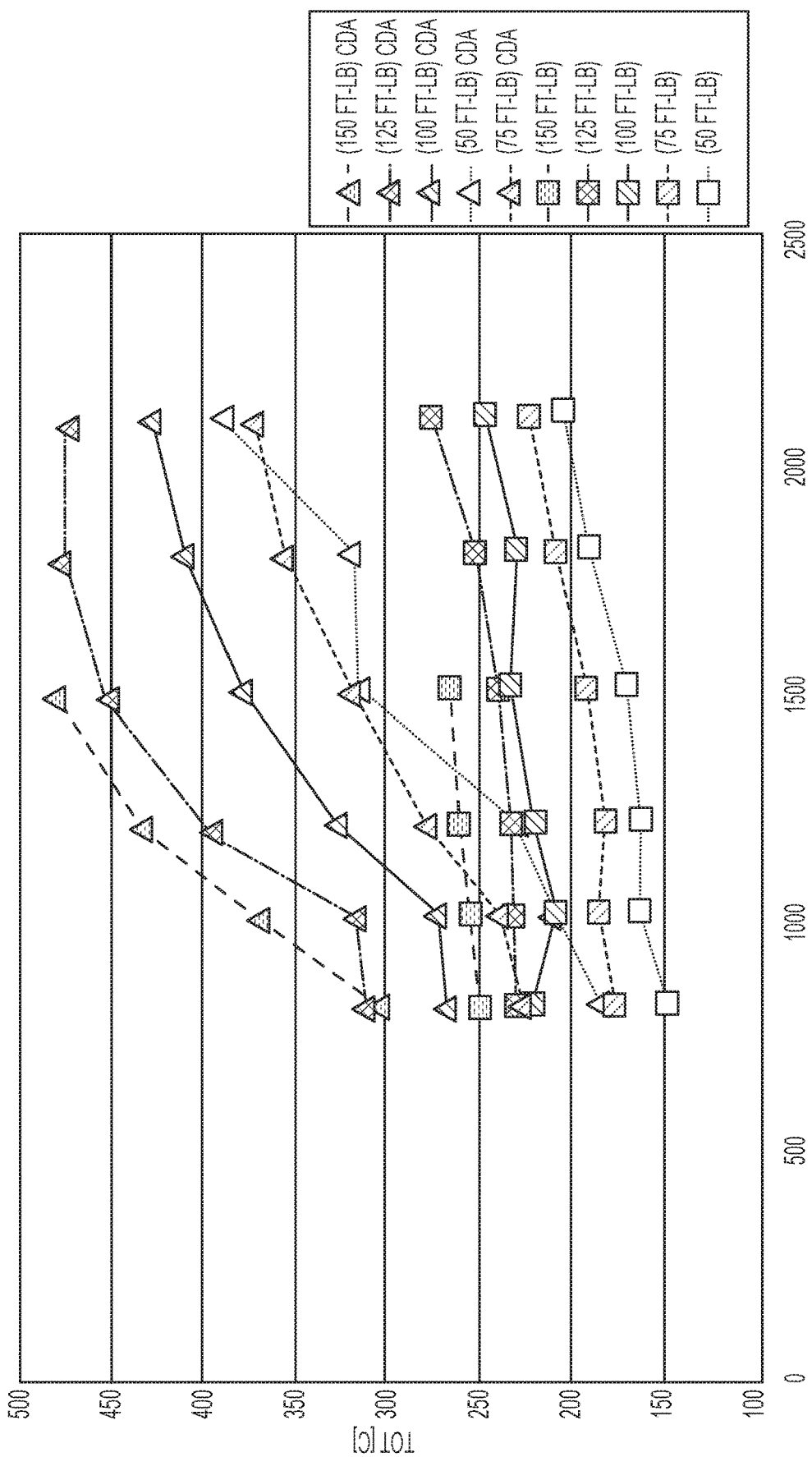
FIG. 9 shows aspects of thermal management as a function of engine speed and cylinder action.
Figure 10:
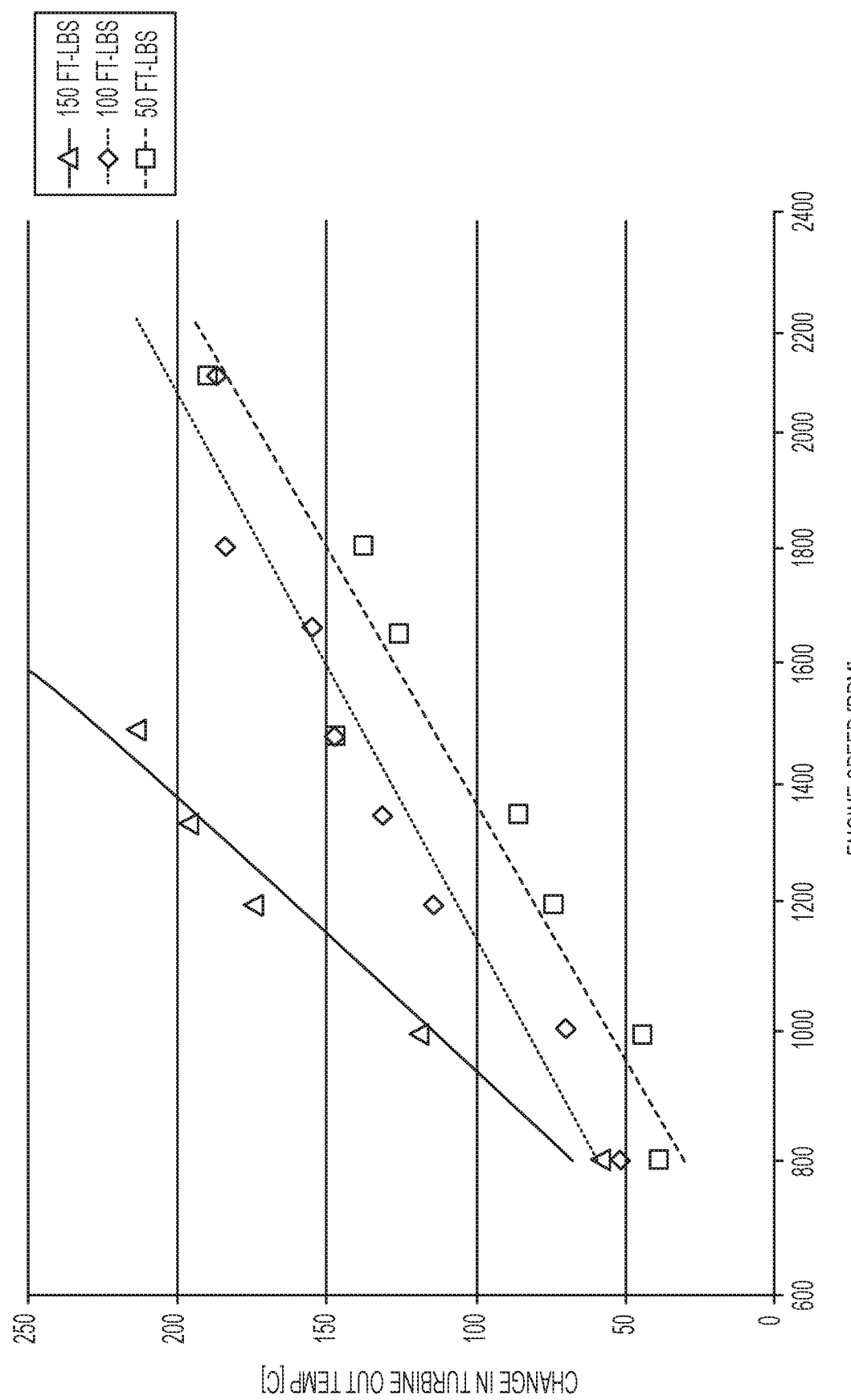
FIG. 10 shows aspects of thermal management gains as a function of engine speed and engine load.
Figure 11:
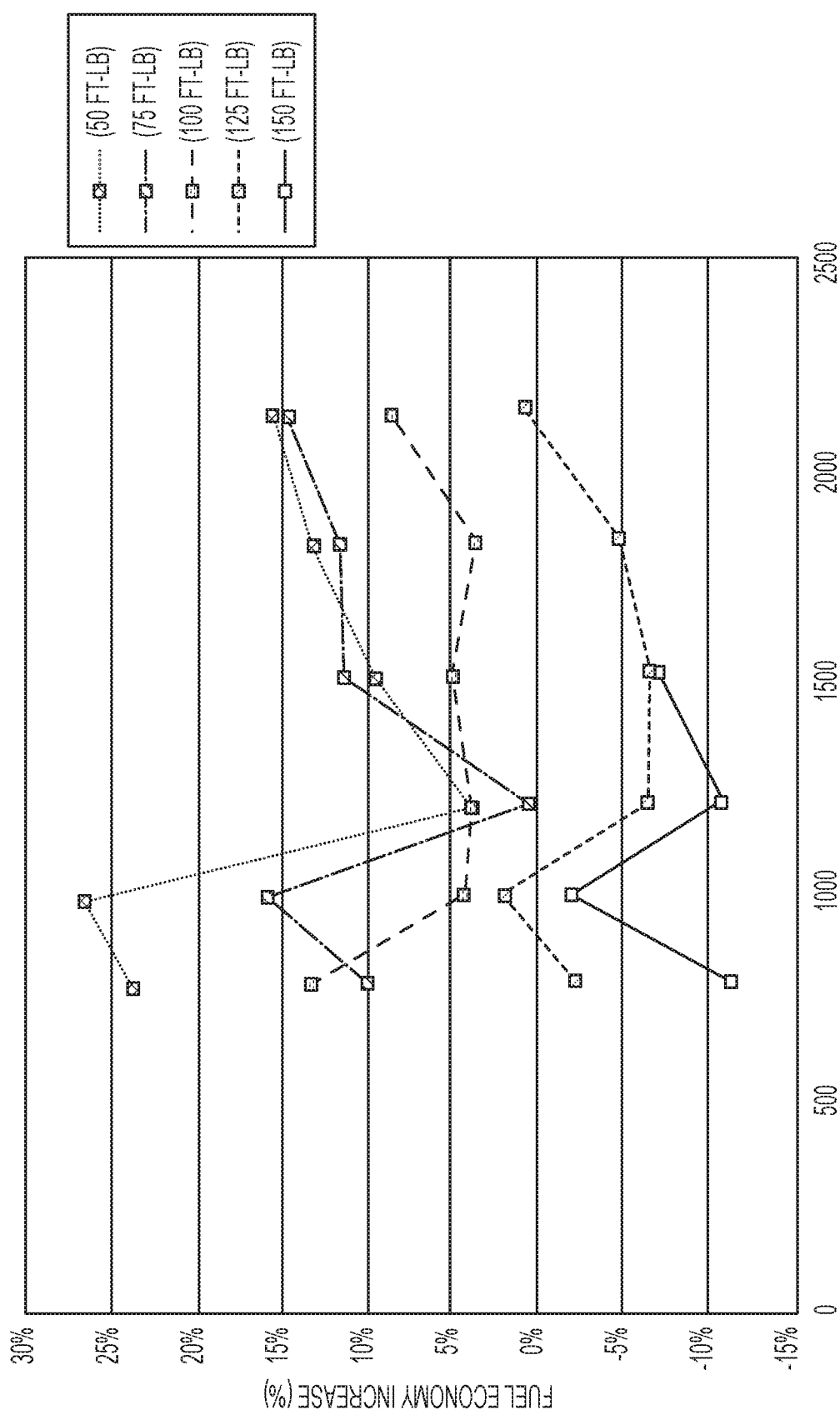
FIG. 11 shows fuel economy benefits.

The benefits of cylinder deactivation mode are further explained in FIGS. 9-11. In FIG. 9, exhaust temperature in the form of a "turbine out temperature" or TOT, in degrees Centigrade, is plotted against the engine speed in rotations per minute. Being an expression in the art, turbine out temperature can at times correspond to a tailpipe temperature when no turbocharger 501 is included in the system.

The peak aftertreatment efficiency zone in this example comprises temperatures above 250 degrees Centigrade. Below this threshold, the aftertreatment system does not efficiently capture pollutants because it is too cold. The example engine operates in 6-cylinder combustion mode for a variety of loads in foot-pounds, yet the engine cannot achieve the threshold temperature for the aftertreatment for most of the loads and engine speeds. Implementing cylinder deactivation on the same loads adds heat to the exhaust, because the compressed charge raises the heat of the exhaust and because the reduced flow rate through the engine permits heat-soaking the aftertreatment system. Also, to reach the target loads, the efficiency and heat of the combustion mode cylinders is increased as by adding more fuel to the combustion mode cylinders. The ideally heated exhaust emitted by the combustion mode cylinders stagnates in the aftertreatment while the deactivated cylinders charges heat. With a lower flow rate through the engine during deactivation, the convection in the aftertreatement is also reduced. The result of implementing CDA mode is that the exhaust reaches the aftertreatment threshold for most of the load and RPM operating conditions.

FIG. 10 summarizes the benefits by showing the temperature gain of the engine system as a function of engine speeds. Implementing CDA mode changes the turbine out temperature (TOT) anywhere from 40 to 250 degrees Centigrade for the sample RPMs and engine loads.

The fuel economy benefits of CDA mode are outlined in FIG. 11. The engine 100 is typically optimized by the manufacturer for a particular load. So, the benefits of cylinder deactivation reduce the closer a control scheme gets to the already-optimized design parameters. In the example of FIG. 11, the engine is optimized for loads of 150 foot-pounds, so CDA mode does not provide a fuel economy benefit. Nearby loads of 125 foot-pounds also yield little to no fuel economy benefits. However, the technique of providing "an engine within an engine," yields a range of benefits, up to almost 30% fuel economy increase, for lower loads of 50, 75 & 100 foot-pounds.

Figure 7:
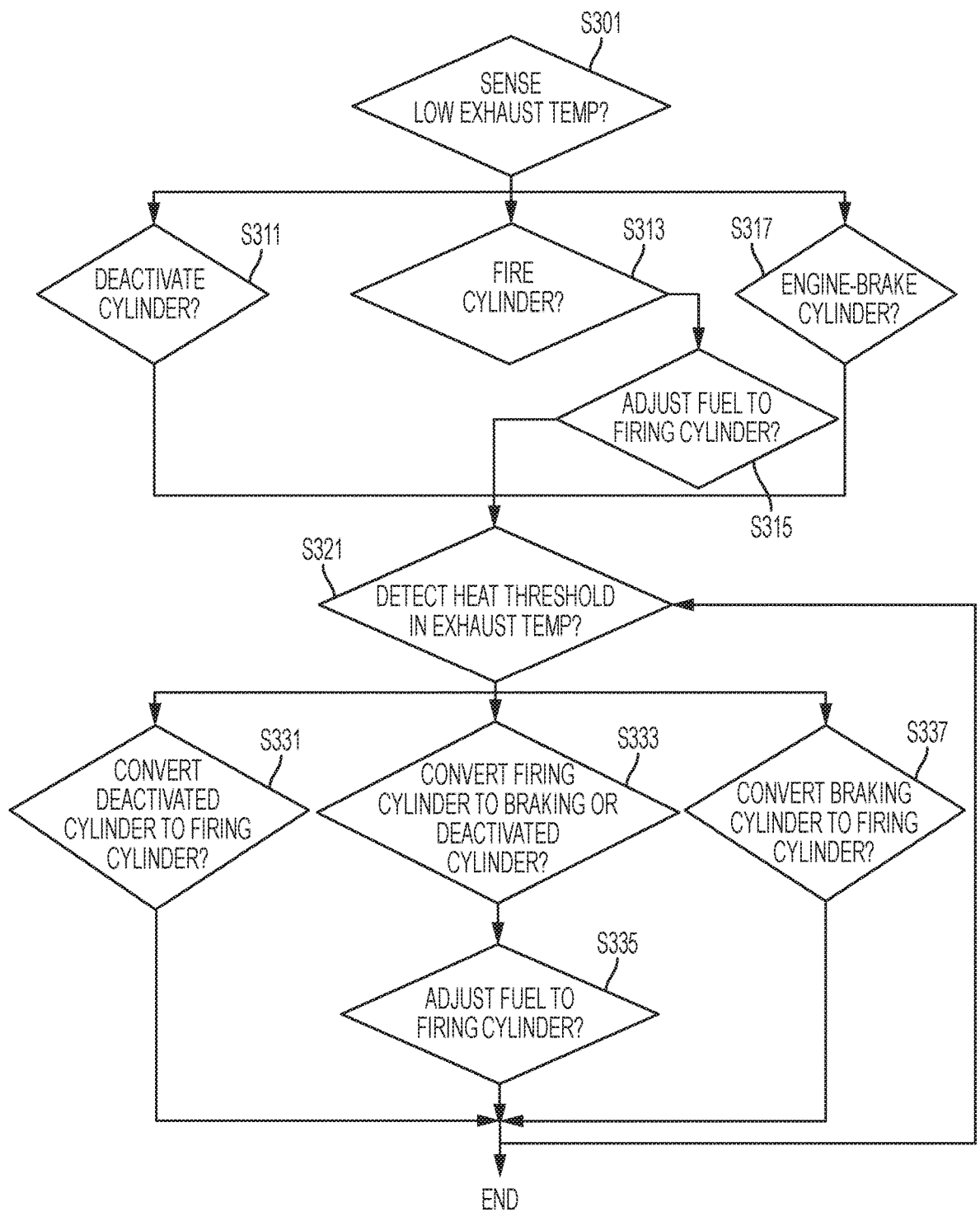

FIG. 7 outlines a method for providing a multitude of "engines within an engine" comprising cylinders in one or more of combustion mode, cylinder deactivation mode, and engine-braking mode. The computer controller 1400 can implement a decision tree to query the system and determine which methodologies to implement. The above and below methodologies are applicable.

Thermal management can be triggered by sensing a low exhaust temperature in step S301. The controllers within processor 1403 process data as above, but the determination further comprises considerations for whether to deactivate a cylinder in step S311 in addition to the decisions to fire a cylinder in combustion mode in step S313 or to engine-brake a cylinder in step S317. When determining whether to fire a cylinder, a corollary decision comprises deciding whether to adjust the fuel supplied to the firing cylinder in step S315. With efficiencies inured by deactivating a cylinder, it may not be necessary to increase fueling despite losing torque on an engine braking cylinder. However, it may be necessary to increase fuel to prevent jerking the vehicle affiliated with the engine or to prevent other harsh transitions. So, if the power setting for a combustion cylinder is changed, it can be determined whether the fuel injected to the combustion cylinder is changed also, or if the motoring torque benefits of the deactivated cylinder will cause a rise in the combustion mode cylinder without additional fueling.

The method can further comprise iteratively checking for desired aftertreatment temperatures. In step S321, a decision is made whether the heat threshold has been detected. If so, a temperature maintenance mode can be entered, which could comprise deciding on a steady-state operation of the engine or choosing a dynamic pattern that holds the temperature. Or, if the threshold temperature is not achieved for the exhaust, or if the threshold is exceeded, it can be necessary to adjust the cylinders allocated to the various modes. And so in step S331, the computer controller 1400 determines whether to convert a deactivated cylinder to a firing cylinder, and determines in step S333 whether to convert a firing cylinder to a braking cylinder or to a deactivated cylinder, and in step S337 determines whether to convert a compression release braking (CRB) cylinder to a firing cylinder. These decisions are based also on desired power settings, as outlined below. If a combustion mode cylinder is switched, or if the power setting of the combustion mode cylinder is altered, then the computer controller determines whether to adjust fuel to the firing cylinder in step S335.

In a gasoline engine, cylinder deactivation (CDA) works to reduce pumping losses, and to reduce need for an intake throttle. The benefits are related to flow and drag losses. A gasoline engine must be run stoichiometric with respect to fuel and air, and so CDA's benefits are more limited.

On a diesel engine, which lacks a throttle, CDA is less about pumping losses, and more about efficient combustion. The diesel engine can have a range of air to fuel ratios (AFR). The AFR can be adjusted to conditions, and so CDA works to run each cylinder at a higher load, which increases that cylinder's brake thermal efficiency, which improves fuel economy. CDA permits fuel economy benefits by deactivating one or more cylinders to conserve fuel to that cylinder and to conserve energy expenditures to actuate that cylinder. Fuel economy is increased in the remaining active cylinders, because the fuel to those cylinders is adjusted in response to the deactivated cylinder and in response to the load or idle conditions. The amount of fuel can be metered for the circumstances. However, no fuel is supplied to the deactivated cylinder.

Cylinder deactivation mode can be implemented with the above. In steady state conditions, a given number of cylinders are compression release braking (NB) and another set of cylinders are powered and firing in combustion mode (NC) and the remaining cylinders are operating in CDA mode (ND). All these cylinders can be operated under these modes for an extended period of time or many engine revolutions.

Table 6 shows steady state conditions where compression release braking (CRB) (NB) is used on one or more of the cylinders in conjunction with cylinders that are running at a given power level (NC) and another set of cylinders that are operating in cylinder deactivation mode (ND). For the example where each cylinder of a 6 cylinder engine produces 50 Hp, and where maximum engine braking produces −40 Hp per cylinder, there are ten power levels available under steady state conditions. Net horsepower (Hp) is shown in the left column, followed by the calculation for the net horsepower. The maximum total power setting (MaxP) on the combustion mode cylinders (NC) has subtracted therefrom the absolute value of the engine-braking power setting (CRBp).

TABLE 6

| Hp | Max$_P$-CRB$_p$ | Cylinder #1 | Cylinder #2 | Cylinder #3 | Cylinder #4 | Cylinder #5 | Cylinder #6 |
|---|---|---|---|---|---|---|---|
| 160 | 200-40 | CRB | CDA | 100% | 100% | 100% | 100% |
| 110 | 150-40 | CRB | CDA | CDA | 100% | 100% | 100% |
| 70 | 150-80 | CRB | CRB | CDA | 100% | 100% | 100% |
| 60 | 100-40 | CRB | CDA | CDA | CDA | 100% | 100% |
| 20 | 100-80 | CRB | CRB | CDA | CDA | 100% | 100% |
| 10 | 50-40 | CRB | CDA | CDA | CDA | CDA | 100% |
| −20 | 100-120 | CRB | CRB | CRB | CDA | 100% | 100% |
| −30 | 50-80 | CRB | CRB | CDA | CDA | CDA | 100% |
| −80 | 50-120 | CRB | CRB | CRB | CDA | CDA | 100% |
| −110 | 50-160 | CRB | CRB | CRB | CRB | CDA | 100% |

Alternatively, CDA mode can be implemented in dynamic conditions, which is when a given number of cylinders are engine-braking (CRB) ($N_B$), a given number of cylinders are in CDA mode ($N_D$), and the remaining cylinders are powered and firing in combustion mode ($N_C$). All these cylinders operate under these modes for only one engine cycle (2 engine revolutions). In the next engine cycle, a different set of cylinders are braking, a different set are in CDA mode, and the remaining cylinders are powered. The differences in the sets can be the number of cylinders in each set, or the location in the firing cycle of the cylinders in the sets, or a combination of the two. The patterns can be repeated over a given period of time. Two examples of patterns comprising all three operation modes are given in Table 7. The first pattern is shown repeated in Cycles 2, 5 & 8. A second pattern is shown repeated in Cycles 3, 6 & 9. The cylinders are dynamic, because the cylinders for the first pattern change among the 6 cylinders 1-6. The second pattern also dynamically changes among the 6 cylinders.

In Table 7, the condition is shown where compression release braking (CRB) is used on one or more of the cylinders (NB) in conjunction with cylinders that are running at a given power level in combustion mode (NC) and another set of cylinders that are operating in cylinder deactivation mode (ND). The pattern of which cylinders are in CDA mode, CRB mode and power/combustion mode varies from engine cycle to engine cycle. Details are shown for a 6 cylinder engine where each cylinder when under power produces 50 Hp, and where maximum engine braking produces an absolute value of 40 Hp per cylinder.

Table 7 outlines a nine-engine cycle pattern. By varying which cylinders, number and placement, are CRB mode, combustion mode, and CDA mode, the 6 cylinder engine is effectively 9 different engines in one. In the first engine cycle, 4 cylinders are firing at full power (NC=4) and 2 cylinders are in CDA mode (ND=2). In the second engine cycle, 2 cylinders are firing at full power (NC=2), 2 cylinders are in CDA mode (ND=2), and 2 cylinders are in CRB mode $N_B$=2). In the third engine cycle, no cylinders are firing at full power (NC=0), 2 cylinders are in CDA mode (ND=2), and 4 cylinders are in CRB mode ($N_B$=4). The powered, CRB and CDA number of cylinders pattern is repeated, but they move to different set of cylinders. This pattern will output a net torque (total engine power setting) of (200+20-120)/3=33.3 Hp.

TABLE 7

| | Hp | Cylinder #1 | Cylinder #2 | Cylinder #3 | Cylinder #4 | Cylinder #5 | Cylinder #6 |
|---|---|---|---|---|---|---|---|
| Cycle 1 | 200 | 100% | 100% | CDA | 100% | 100% | CDA |
| Cycle 2 | 20 | CRB | 100% | CDA | 100% | CRB | CDA |
| Cycle 3 | −120 | CRB | CRB | CDA | CRB | CRB | CDA |
| Cycle 4 | 200 | 100% | CDA | 100% | 100% | CDA | 100% |
| Cycle 5 | 20 | 100% | CDA | CRB | 100% | CDA | CRB |
| Cycle 6 | −120 | CRB | CDA | CRB | CRB | CDA | CRB |
| Cycle 7 | 200 | CDA | 100% | 100% | CDA | 100% | 100% |
| Cycle 8 | 20 | CDA | CRB | 100% | CDA | CRB | 100% |
| Cycle 9 | −120 | CDA | CRB | CRB | CDA | CRB | CRB |
| Cycle 10 | 200 | 100% | 100% | CDA | 100% | 100% | CDA |

In another aspect, it is desirable to provide variable braking power for diesels. Diesel engines used on on-highway application required some type of engine brake to assist in the slowing down of the heavily loaded vehicle. Today many braking systems are limited to either full braking power or 50% braking power. Sometimes it is desirable to have a braking power setting somewhere between these two points. Selectable steady state braking or dynamic braking (skip braking) are the terms used to describe this type of operating condition.

Traditional variable braking is operating a diesel engine where one or more of the cylinders, of a multi-cylinder engine, are operated in compression release braking mode. Table 8 below is a steady state strategy that produces a given braking power depending on the number of cylinders turned off. Seven options are available. In traditional applications, sets of cylinders are locked for the life of the engine to either operate normally or in braking mode. Traditional engines have dedicated cylinders, and cannot switch among them, nor select individually which of them actuate. The dedicated sets are either engine-braking or combusting normally. These traditional variable braking diesel engines benefit from the control programming and methods disclosed herein to extend the operation of engine braking to additional operational modes, namely fuel economy and thermal management modes.

Table 8 shows the conditions where compression release braking (CRB) of a given cylinder is turned on for a set period of time. For a 6 cylinder engine where maximum engine braking produces 40 Hp per cylinder there are seven power levels available under steady state conditions. The horsepower is shown as a loss in the left column. No fueling is occurring to provide positive power to the crankshaft 101, so 0% power is shown for the cylinders where there is no engine-braking (CRB) mode. The maximum total power setting (MaxP) on the combustion mode cylinders (NC) (MaxP) is zero. The crankshaft 101 sees zero power or negative power for braking the crankshaft.

| Hp | Max$_P$-CRB$_p$ | Cylinder #1 | Cylinder #2 | Cylinder #3 | Cylinder #4 | Cylinder #5 | Cylinder #6 |
|---|---|---|---|---|---|---|---|
| 0 | 0 | 0% | 0% | 0% | 0% | 0% | 0% |

-continued

| Hp | Max$_P$-CRB$_p$ | Cylinder #1 | Cylinder #2 | Cylinder #3 | Cylinder #4 | Cylinder #5 | Cylinder #6 |
|---|---|---|---|---|---|---|---|
| −40  | 0-40  | CRB | 0%  | 0%  | 0%  | 0%  | 0%  |
| −80  | 0-80  | CRB | CRB | 0%  | 0%  | 0%  | 0%  |
| −120 | 0-120 | CRB | CRB | CRB | 0%  | 0%  | 0%  |
| −160 | 0-160 | CRB | CRB | CRB | CRB | 0%  | 0%  |
| −200 | 0-200 | CRB | CRB | CRB | CRB | CRB | 0%  |
| −240 | 0-240 | CRB | CRB | CRB | CRB | CRB | CRB |

One aspect of the disclosure comprises skip-braking, which is operating a diesel engine where one or more of the cylinders, of a multi-cylinder engine 100, operate in compression release braking mode ($N_B = Y_6$), but the cylinders that are in braking mode only operate in this mode for one engine cycle, or two engine revolutions. The next engine cycle, a different set and/or number of cylinders are put in compression release braking mode ($N_B = Y_7$). On the third engine cycle, another set and number of cylinders can be put in compression release braking mode ($N_B = Y_8$), or one could repeat the first revolution braking mode pattern ($N_B = Y_6$) and repeat the pattern for a given period of time. Table 9 shows a skip braking strategy where intermediate power settings are available depending on the braking pattern that is chosen.

Skip-firing is a technique where fuel 320 is selectively injected to select cylinders 1-6. Skip-firing can "skip" which cylinders get fuel. However, skip-braking "skips" which cylinders engine-brake. Skip-braking can also comprise varying the quantity of braking power applied to the selected cylinder (NB).

Table 9 shows the conditions where compression release braking (CRB) mode for a given cylinder is turned on and off over a given number of engine revolutions. For a 6 cylinder engine where maximum engine braking produces 40 Hp per cylinder, there are seven additional power levels available under dynamic switching conditions. For this example, dynamic switching is switching from no power on a given cylinder to full braking on that same cylinder. Nop is the condition when there is no braking power generated by the engine and no positive power being generated by the engine via combustion mode. This would be a normal, non-fueled, 4 stroke cycle. CRB is the power of the compression release braking.

TABLE 9

| Hp | No$_P$-CRB$_p$ | Cylinder #1 | Cylinder #2 | Cylinder #3 | Cylinder #4 | Cylinder #5 | Cylinder #6 |
|---|---|---|---|---|---|---|---|
| 0    | (0-0)/2    | 0%       | 0%       | 0%       | 0%       | 0%       | 0%       |
| −20  | (0-40)/2   | 0%⇔CRB   | 0%       | 0%       | 0%       | 0%       | 0%       |
| −40  | (0-80)/2   | 0%⇔CRB   | 0%⇔CRB   | 0%       | 0%       | 0%       | 0%       |
| −60  | (0-120)/2  | 0%⇔CRB   | 0%⇔CRB   | 0%⇔CRB   | 0%       | 0%       | 0%       |
| −80  | (0-160)/2  | 0%⇔CRB   | 0%⇔CRB   | 0%⇔CRB   | 0%⇔CRB   | 0%       | 0%       |
| −100 | (0-200)/2  | 0%⇔CRB   | 0%⇔CRB   | 0%⇔CRB   | 0%⇔CRB   | 0%⇔CRB   | 0%       |
| −120 | (0-240)/2  | 0%⇔CRB   | 0%⇔CRB   | 0%⇔CRB   | 0%⇔CRB   | 0%⇔CRB   | 0%⇔CRB   |

Table 9 permits conditions to vary for each revolution. It is possible to apply CRB mode to a cylinder, turning CRB mode on and off for the cylinder. Or, it is possible to change which cylinder has 0% power output versus full (100%) CRB applied.

In the left column in Table 9, the horsepower (Hp) output for an engine cycle comprising two revolutions is half of the 100% power application of the CRB cylinder. Since CRB removes power, the value is negative.

When no CRB mode is applied in the first row of cylinders, the engine does not lose power via CRB mode. Normal operation of combustion mode puts out normal power levels, and the row reflects no changes via CRB mode. The cylinders of the first row can use fuel efficiency mode, fuel economy mode, high BTE mode, CDA mode, or VVL techniques, as desired. But, the above Table 9 only shows changes by way of CRB mode.

In the second row of cylinders, the cylinder 1 switches between no (0%) CRB mode to 100% CRB mode. Engine-braking occurs on one revolution of the engine cycle, so −40 Hp occurs on the one revolution, and the cycle average is −20 Hp. CRB mode removes 20 Hp from the crankshaft for the engine cycle, but 40 Hp total for the affected piston revolution.

The remaining rows continue the trend that as more cylinders switch from 0% CRB mode to 100% CRB mode, more torque is removed from the crankshaft and more braking power is supplied by the engine 100.

In another aspect, compression release braking (CRB) mode of a given cylinder is turned on and off over a given number of engine revolutions and the cylinder that is in CRB mode changes depending on the cycle number in the multi-cycle strategy. The advantage of this Table 10 & 11 strategy over the Table 9 strategy would be to provide better NVH (vibration) performance of the engine while in CRB mode.

Table 10 shows details for a 6 cylinder engine, where maximum engine braking produces 40 Hp per cylinder. Dynamic switching is switching, from cycle to cycle, from no power on a given cylinder to full engine-braking on that same given cylinder to no power on that same cylinder to full engine-braking on a different cylinder.

Table 10 shows a first example of shutting down 2 cylinders every other engine braking cycle. A single cylinder cycle pattern is shown, wherein a single cylinder is engine-braking, but is dynamically moving to different cylinders every other engine cycle. Average braking output power is =(0−40)/2=−20 Hp.

TABLE 10

|         | Hp  | Cylinder #1 | Cylinder #2 | Cylinder #3 | Cylinder #4 | Cylinder #5 | Cylinder #6 |
|---|---|---|---|---|---|---|---|
| Cycle 1 | 0   | 0%  | 0%  | 0%  | 0%  | 0%  | 0%  |
| Cycle 2 | −40 | CRB | 0%  | 0%  | 0%  | 0%  | 0%  |

TABLE 10-continued

| | Hp | Cylinder #1 | Cylinder #2 | Cylinder #3 | Cylinder #4 | Cylinder #5 | Cylinder #6 |
|---|---|---|---|---|---|---|---|
| Cycle 3 | 0 | 0% | 0% | 0% | 0% | 0% | 0% |
| Cycle 4 | −40 | 0% | 0% | 0% | CRB | 0% | 0% |
| Cycle 5 | 0 | 0% | 0% | 0% | 0% | 0% | 0% |
| Cycle 6 | −40 | 0% | CRB | 0% | 0% | 0% | 0% |
| Cycle 7 | 0 | 0% | 0% | 0% | 0% | 0% | 0% |
| Cycle 8 | −40 | 0% | 0% | 0% | 0% | CRB | 0% |

Table 11 shows another example of a single cylinder cycle patter where a single cylinders is engine-braking, but is dynamically moving to different cylinder every third engine cycle. The average braking output power is (0Hp−40Hp)/3=−13.3 Hp.

TABLE 11

| | Hp | Cylinder #1 | Cylinder #2 | Cylinder #3 | Cylinder #4 | Cylinder #5 | Cylinder #6 |
|---|---|---|---|---|---|---|---|
| Cycle 1 | 0 | 0% | 0% | 0% | 0% | 0% | 0% |
| Cycle 2 | −40 | CRB | 0% | 0% | 0% | 0% | 0% |
| Cycle 3 | 0 | 0% | 0% | 0% | 0% | 0% | 0% |
| Cycle 4 | 0 | 0% | 0% | 0% | 0% | 0% | 0% |
| Cycle 5 | −40 | 0% | 0% | 0% | CRB | 0% | 0% |
| Cycle 6 | 0 | 0% | 0% | 0% | 0% | 0% | 0% |
| Cycle 7 | 0 | 0% | 0% | 0% | 0% | 0% | 0% |
| Cycle 8 | −40 | 0% | CRB | 0% | 0% | 0% | 0% |
| Cycle 9 | 0 | 0% | 0% | 0% | 0% | 0% | 0% |
| Cycle 10 | 0 | 0% | 0% | 0% | 0% | 0% | 0% |
| Cycle 11 | −40 | 0% | 0% | 0% | 0% | CRB | 0% |

In another aspect, Table 12 shows a two cylinder cycle pattern where two cylinders are engine-braking, but are dynamically moving to different cylinders every other engine cycle. Average braking output power is =(0Hp−80Hp)/2=−40 Hp. By varying the cylinders activated, it is as if the engine is two engines: a free-running engine and a braking engine.

TABLE 12

| | Hp | Cylinder #1 | Cylinder #2 | Cylinder #3 | Cylinder #4 | Cylinder #5 | Cylinder #6 |
|---|---|---|---|---|---|---|---|
| Cycle 1 | 0 | 0% | 0% | 0% | 0% | 0% | 0% |
| Cycle 2 | −80 | CRB | CRB | 0% | 0% | 0% | 0% |
| Cycle 3 | 0 | 0% | 0% | 0% | 0% | 0% | 0% |
| Cycle 4 | −80 | 0% | 0% | 0% | CRB | CRB | 0% |
| Cycle 5 | 0 | 0% | 0% | 0% | 0% | 0% | 0% |
| Cycle 6 | −80 | 0% | CRB | CRB | 0% | 0% | 0% |
| Cycle 7 | 0 | 0% | 0% | 0% | 0% | 0% | 0% |
| Cycle 8 | −80 | 0% | 0% | 0% | 0% | CRB | CRB |

In yet another aspect, Table 13 shows a three engine cycle pattern where all cylinders are in a non-firing mode ($N_F$=6). The non-firing mode comprises no fueling to what would be a firing combustion mode cylinder. The non-firing cylinder is now merely an air pump. The intake valves 130 and exhaust valves 150 remain active and pump air in the first engine cycle. On the second cycle two cylinders are engine-braking ($N_B$=2) and four are non-firing ($N_F$=4) and pumping air. On the third cycle four cylinders are engine braking ($N_B$=4) and two cylinders are non-firing but pumping air ($N_F$=2). In the next set of three cycles, that pattern changes as shown in Table 13. The cylinders that were engine-braking dynamically move to a different set of cylinders for the next three engine cycles. Average output power is ==(0Hp−80Hp−160Hp)/3=−80 Hp. One use of this strategy is to give different braking power levels. If a driver wants to slow a vehicle slowly (coast) instead of fast breaking, the vehicle operates this way. For fast braking, all cylinders can be braking and throwing heat off to the aftertreament for thermal management.

TABLE 13

| | Hp | Cylinder #1 | Cylinder #2 | Cylinder #3 | Cylinder #4 | Cylinder #5 | Cylinder #6 |
|---|---|---|---|---|---|---|---|
| Cycle 1 | 0 | 0% | 0% | 0% | 0% | 0% | 0% |
| Cycle 2 | −80 | CRB | CRB | 0% | 0% | 0% | 0% |
| Cycle 3 | −160 | CRB | CRB | 0% | CRB | CRB | 0% |
| Cycle 4 | 0 | 0% | 0% | 0% | 0% | 0% | 0% |
| Cycle 5 | −80 | 0% | 0% | 0% | CRB | CRB | 0% |
| Cycle 6 | −160 | CRB | CRB | 0% | CRB | CRB | 0% |
| Cycle 7 | 0 | 0% | 0% | 0% | 0% | 0% | 0% |
| Cycle 8 | −80 | 0% | CRB | CRB | 0% | 0% | 0% |
| Cycle 9 | −160 | 0% | CRB | CRB | 0% | CRB | CRB |

In another aspect, variable engine-braking power for diesels can be done with a minimum of cooling introduced into the exhaust. Diesel engines used for on-highway applications required some type of engine brake to assist in the slowing down of the heavily loaded vehicle. Today many braking systems are limited to either full braking power or 50% braking power. Sometimes it is desirable to have an engine-braking power setting somewhere between these two points. In addition, todays engine-braking systems dump the air being pumped into the cylinders on the intake stroke into the exhaust, cooling the aftertreatment system in some circumstances. Minimizing any air that is being pumped into the exhaust 420 is desirable in some operating conditions. This can be accomplished by using CDA mode on the cylinders that are not being used for engine compression release braking mode. By deactivating the cylinder, the intake and exhaust valves 130, 150 are closed, a charge is trapped in the cylinder, and that cylinder is no longer a pass-through for cold intake air. Further, since fuel injection is shut off for the CDA mode cylinder, fuel economy increases for that cylinder.

In a first aspect of this CDA mode with variable engine-braking, the diesel engine is operated where one or more of the cylinders 1-6, of a multi-cylinder engine, are operate in compression release braking mode (NC=Y9) and the remaining cylinders are operated in cylinder deactivation mode (ND=Z1). Table 14 below is a steady state strategy that produces a given engine-braking power depending on the number of cylinders turned off. Seven options are available. One will notice that this strategy looks very similar to Table 8 given above, but CDA mode is used to prevent pumping the air through the non-powered cylinder.

Table 14 shows conditions where compression release braking (CRB) mode of a given cylinder ($N_B$=Y10) is turned on for a set period of time. For a 6 cylinder engine where maximum engine braking produces 40 Hp per cylinder there are seven power levels available under steady state conditions. The left column shows the net engine power setting output for the details in the second column.

TABLE 14

| Hp | CDA$_P$-CRBp | Cylinder #1 | Cylinder #2 | Cylinder #3 | Cylinder #4 | Cylinder #5 | Cylinder #6 |
|---|---|---|---|---|---|---|---|
| 0 | 0 | CDA | CDA | CDA | CDA | CDA | CDA |
| −40 | 0-40 | CRB | CDA | CDA | CDA | CDA | CDA |
| −80 | 0-80 | CRB | CRB | CDA | CDA | CDA | CDA |
| −120 | 0-120 | CRB | CRB | CRB | CDA | CDA | CDA |
| −160 | 0-160 | CRB | CRB | CRB | CRB | CDA | CDA |
| −200 | 0-200 | CRB | CRB | CRB | CRB | CRB | CDA |
| −240 | 0-240 | CRB | CRB | CRB | CRB | CRB | CRB |

In the first row, all cylinders are deactivated, and functionally no power is produced by the engine. In the second row, one cylinder supplies −40 Hp via CRB mode. Since the other cylinders are deactivated in CDA mode, they are not impacting the torque output positively or negatively. Energy is lost to compress the charge, but spring back returns much of the lost energy.

Table 14 is an oversimplification for explanatory purposes. Fractional losses and contributions can occur via several avenues, such as piston drag, enhanced cam actuation on the CDA cam rail, etc. So, motoring torque gains are ignored in this discussion.

In yet another aspect of variable power for diesel engines, steady state cylinder deactivation comprises operating a diesel engine where one or more of the cylinders, of a multi-cylinder engine, are deactivated in CDA mode (ND=Z2). The cylinders can be operated under this CDA mode for an extended period of time or many engine revolutions. Cylinder deactivation (CDA) mode is where the intake valve 130, exhaust valve 150, and fuel injection 310 are shut off for a selected cylinder cycle.

Table 15 shows conditions where cylinder deactivation (CDA) mode cylinders (ND=Z3) are used in conjunction with combustion mode cylinders (NC=X6) running at a power level. For ease of discussion, the power level is shown at 100% for the combustion mode cylinder, though power p from 0<p≤100% is available to the firing combustion mode cylinder. For a 6 cylinder engine where each cylinder produces 50 Hp and where cylinder deactivation produces no power, there are seven power levels available under steady state conditions. The maximum total power setting (MaxP) on the combustion mode cylinders (NC) has subtracted therefrom the absolute value of the engine-braking power setting (CRBp).

TABLE 15

| Hp | Max$_P$-CRB$_p$ | Cylinder #1 | Cylinder #2 | Cylinder #3 | Cylinder #4 | Cylinder #5 | Cylinder #6 |
|---|---|---|---|---|---|---|---|
| 300 | 300-0 | 100% | 100% | 100% | 100% | 100% | 100% |
| 250 | 250-0 | CDA | 100% | 100% | 100% | 100% | 100% |
| 200 | 200-0 | CDA | CDA | 100% | 100% | 100% | 100% |
| 150 | 150-0 | CDA | CDA | CDA | 100% | 100% | 100% |
| 100 | 100-0 | CDA | CDA | CDA | CDA | 100% | 100% |
| 50 | 50-0 | CDA | CDA | CDA | CDA | CDA | 100% |
| 0 | 0-0 | CDA | CDA | CDA | CDA | CDA | CDA |

Table 15 shows that for every deactivated cylinder, 50 Hp is lost. So, by varying the number of cylinders in CDA mode, and by varying the power level to the remaining cylinders, one can tailor the torque output of the crankshaft 101 to meet power output requirements. Layering the above concepts for BTE of the cylinders permits tailoring of the aftertreament thermal conditions.

In further aspects, powered braking techniques can be layered with traditional braking methods, thus augmenting those systems. For example, powered braking can be applied to variable geometry turbochargers (VGT) or exhaust retarders (ER). Exhaust Retarders (ER) are sometimes referred to as brakes. One type is a butterfly valve downstream of a turbocharger. When it closes, it creates more engine back pressure and causes a restriction in flow. This restriction can help with braking and can be controlled to increase or decrease the engine-braking power settings. Such an exhaust retarder can be integrated in to the exhaust sensor 807 as an affiliated actuator and the exhaust retarder can be networked to the control area network CAN. Variable geometry turbine (VGT) turbochargers 501 are another source of braking via flow restriction. Operating the VGT in a more closed position can add to braking power. The limitation on how far the VGT can be closed is the speed of the turbocharger. As the VGT closes, the speed of the turbocharger increases. Most VGTs are kept below about 120,000 rpm and these devises can accelerate at 100,000 rpm per second.

It is possible to use exhaust retarders and variable geometry turbines to supply extra braking power while applying powered engine-braking. The release of compressed flow via CRB impacts the back-pressure to the engine, so the braking effect is similar to that supplied by ER & VGT. The high heat of the compressed flow increases pressure. So while CRB mode can be used with ER and VGT, CRB mode is more effective than either ER or VGT.

By implementing the above techniques, it is possible to maintain good light-off of the aftertreatment at various engine power output conditions. Whether it be idle, loaded idle, or low to medium load conditions, powered braking permits a short time to light-off by permitting cylinders to run at close to engine stoichiometric operation and engine maximum power operation, while conserving fuel to unnecessary cylinders. Powered braking also contributes to aftertreatment heat build-up to facilitate good light-off.

Additional benefits of CDA mode are outlined below. Pollution is reduced by deactivating cylinders in CDA mode. Turning off one or more cylinders causes reduction in inefficient fuel use, which lowers pollution and fuel consumption. So, CDA causes instantaneous benefits.

But, adjusting AFR to the active cylinders can increase pollution by increasing the efficiency of combustion. Efficient fuel use in a cylinder can increase NOx. So with CDA mode, the amount of air necessary for optimal combustion is also tailored to the active cylinder. In a low load condition, the amount of torque output needed is quite small. Pushing air in to all cylinders, and pushing fuel in to all cylinders puts out too much torque and uses too much energy and fuel. Deactivating one or more cylinders permits one or more remaining cylinders to use more fuel or less air, resulting in a hotter combustion. The higher heat combustion has lower pollution because the catalyst bed can be heated and pollution can be better filtered by the aftertreatment system, which runs most efficiently when heated to between 200-300 Degrees Centigrade, depending on catalyst contents.

Adjusting the AFR with CDA mode instantly heats the exhaust. The higher heat exhaust warms the catalyst 800 to its optimum filtering temperature.

On the one hand, NOx emissions reduce during CDA in low load conditions because there is a decrease in the amount of exhaust gas output. Fewer cylinders in use spew less exhaust. Less exhaust output generates less NOx. However, higher fuel economy increases NOx, because efficient combustion increases NOx. Thus, there are tradeoffs between increased fuel efficiency, decreased exhaust amount, and the ability of the catalyst to heat to optimum NOx filtering temperature.

One issue is that a fuel-efficient diesel has increased NOx output. For example, a fuel efficient combustion diesel can output 6-9 grams NOx/engine hour. However, regulations require output of 0.2, and soon to be 0.02 grams NOx/engine hour. Only by having an efficient aftertreatment system can the goal be reached while satisfying consumer demand for fuel efficiency. And so it becomes necessary to heat the catalyst quickly for efficient filtering and for efficient burn-off.

The exhaust heats instantly, because CDA can be turned on and off in one cam revolution, but the surrounding metal, such as cylinder-to-cylinder heat transfer and such as the catalyst itself, take longer to warm up from heat transfer. Meeting future emissions standards becomes an issue of heating the operating environment around the ideally heated exhaust.

Using CDA, it is also possible to remove the fuel doser that would otherwise be needed to clean the catalyst during low load or low temperature operation. This reduces aftertreatment fuel use and expenses.

In one aspect, it is possible to redesign the aftertreatment for one temperature band for efficient operation. Ideally, the catalyst operates from 200-600 degrees Centigrade, but from a materials science perspective, it is difficult to design the catalyst for the whole temperature operating range 0-600 C. Thus, using CDA to instantly heat the exhaust to 200 or more degrees Centigrade alleviates some of the material burden of including a low temperature filtering material in the catalyst. The optimal temperature band of the aftertreatment can be moved, and the materials within adjusted accordingly.

Also, using a thermoelectric heater in the catalyst furthers the goal of raising the exhaust temperature. Heating this cold area permits the exhaust heat to operate on the catalyst 800 for efficient NOx filtering.

This furthers the goal of redesign of the aftertreatment for one temperature band for efficient operation. Installing a thermoelectric heater further alleviates the burden of including low temperature filtering materials in the catalyst. The optimal temperature band of the aftertreatment can be moved, and the materials within adjusted accordingly.

One way to generate electricity for the thermoelectric heater includes installing a thermoelectric generator between firing and non-firing cylinders. A CDA cylinder can be cold, and a firing or braking cylinder is hot. A temperature gradient exists in the engine block, and a thermoelectric generator can power system electronics.

It is also possible to increase open cycle efficiency by using engine-braking mode and cylinder deactivation mode.

The engine operation begins by "skip braking" cylinders. One or more cylinders are braked to drive up heat in the aftertreatment, which impacts the measurable turbine-out-temperature (TOT). To the active, firing cylinders, more fuel is added for a few cycles. While not fuel efficient, the setback is minor, and done at idle. The increased fuel increases the torque output for those cylinders. This "skip braking" technique is not the same as "skip firing."

Skip braking half of the cylinders can balance torsionals from the engine, where skip firing (selectively shutting off fuel) cannot. Skip braking can be used in operational modes where skip firing is avoided.

The strategy permits tailoring of the manifold pressures. So, intake manifold pressure can be greater than exhaust manifold pressure, or vice versa. The cylinder use strategy determines the manifold pressure.

For many off-highway vehicles, that operate at low load for most of their operation time, dividing the cylinders between fueled, braked, and deactivated essentially creates a small engine for start, stop and low load, but the engine can continue to be sized and built to high load, where the vehicle rarely operates.

Clients desire to have control of their frame rail for providing cooling to their undercarriage components, and would prefer to have circulation for cooled parts. But, the aerodynamic shields take up space on the frame rail and trap heat on the frame rail. One way to give more space to the clients is to move the aftertreatment up to the engine compartment. When using CDA with or without engine braking, the size of the aftertreatment system can be reduced because of its efficient operation range and contents, which facilitates moving the aftertreatment up to the engine compartment.

Entry in to CDA mode and CRB mode for thermal management should not cause a user experience such as a jerk or torque change. So, adjusting the fuel is part of the control strategy. Several fuel dosing strategies can be used to enter and exit CDA mode, as outlined above. A quantity of fuel N for a cylinder can be adjusted based on conditions and operation modes. The fuel value N adjusts by a ratio A based on the number of cylinders deactivated, the number of cylinders engine-braking, and the number of cylinders in combustion mode. That number of cylinders is based on the load on the engine. In one example, shown in Table 16, the fuel value N for different modes is shown.

TABLE 16

|  | Cylinder #1 | Cylinder #2 | Cylinder #3 | Cylinder #4 | Cylinder #5 | Cylinder #6 |
| --- | --- | --- | --- | --- | --- | --- |
| All-Cylinder Combustion Mode | N | N | N | N | N | N |
| Combustion & CDA Mode | Combustion ~2N | Combustion ~2N | Combustion ~2N | CDA; N = 0 | CDA; N = 0 | CDA; N = 0 |
| Transition | Combustion A*N | Combustion A*N | CDA; N = 0 | CDA; N = 0 | CRB; N = 0 | CRB; N = 0 |
| Fire and Brake | Combustion ~3N | Combustion ~3N | Combustion ~3N | CRB; N = 0 | CRB; N = 0 | CRB; N = 0 |

When removing cylinders, the fuel dose is not necessarily a straight whole number fractional of the number of cylinders deactivated. That is, going from 6 cylinders to 3 cylinders will not necessarily mean that fuel use per firing cylinder goes from N to 2N or other whole numbers. Fuel efficiencies and fuel economies attained by using CDA make the ratio A an odd fractional value in many instances. For example, instead of ~2N, the ratio A can be 1.95 to result in 1.95N to the three firing cylinders, and zero fuel to the CDA cylinders in the second row of Table 16.

Other implementations will be apparent to those skilled in the art from consideration of the specification and practice of the examples disclosed herein.

What is claimed is:

1. A method for exhaust temperature management in a multiple-cylinder, reciprocating-piston engine, comprising:
   sensing a low temperature condition of the exhaust;
   implementing an increased heat output engine cycle pattern in response to the sensed low temperature condition, comprising:
      deactivating fuel injection to a first cylinder and a third cylinder of the engine, the first cylinder comprising a first piston reciprocating between top-dead-center and bottom-dead-center, the third cylinder comprising a third piston reciprocating between top-dead-center and bottom-dead-center; and
      activating engine braking mode on the first cylinder by opening one or more valves when the piston is away from bottom-dead-center during a compression stroke; and
      deactivating the third cylinder in a cylinder deactivation mode, comprising deactivating intake valve and exhaust valve actuation on the third cylinder to close the third cylinder; and
   firing a second cylinder of the engine in a combustion mode while the first cylinder is in the engine braking mode and while the third cylinder is in the cylinder deactivation mode, the second cylinder comprising a second piston reciprocating between top-dead-center and bottom-dead-center.

2. The method of claim 1, wherein the one or more valves comprise at least one intake valve and at least one exhaust valve, and wherein the at least one intake valve is opened when the piston is at top-dead-center.

3. The method of claim 1, wherein the one or more valves comprise at least one intake valve and at least one exhaust valve, and wherein the at least one intake valve or the at least one exhaust valve is opened when the piston is near top-dead-center.

4. The method of claim 1, wherein an exhaust valve of the one or more valves is opened to direct cylinder contents to an exhaust manifold.

5. The method of claim 1, wherein an intake valve of the one or more valves is opened to direct cylinder contents to an intake manifold.

6. The method of claim 1, wherein the fuel injection is deactivated for the one or more valves for more than one stroke of the piston, wherein a stroke comprises the piston reciprocating between bottom-dead-center and top-dead-center.

7. The method of claim 6, wherein the engine operates in 6-stroke mode.

8. The method of claim 6, wherein the engine operates in 8-stroke mode.

9. The method of claim 6, wherein the engine operates in 4-stroke mode.

10. The method of claim 1, wherein the first cylinder operates in a 2-stroke mode to open the one or more valves, wherein a stroke comprises the piston reciprocating between bottom-dead-center and top-dead-center, and wherein the second cylinder operates in one of a 4-stroke mode, a 6-stroke mode, and an 8-stroke mode.

11. The method of claim 1, wherein the engine comprises cam actuation of the one or more valves.

12. The method of claim 1, wherein the engine is a diesel engine.

13. The method of claim 1, wherein the engine comprises six cylinders, wherein the first cylinder is activated for engine braking mode, and wherein one to four cylinders, comprising the second cylinder, are firing in combustion mode.

14. The method of claim 1, wherein the engine comprises six cylinders, wherein two cylinders, comprising the first cylinder, are activated for engine braking mode, and wherein one to three cylinders, comprising the second cylinder, are firing in combustion mode.

15. The method of claim 1, wherein the engine comprises six cylinders, wherein three cylinders, comprising the first cylinder, are activated for engine braking mode, and wherein one or two cylinders, comprising the second cylinder, are firing in combustion mode.

16. The method of claim 1, wherein the engine comprises six cylinders, wherein four cylinders, comprising the first cylinder, are activated for engine braking mode, and wherein one cylinder, comprising the second cylinder, is firing in combustion mode.

17. The method of claim 1, wherein the engine comprises six cylinders, wherein the first cylinder is activated for engine braking mode, wherein the third cylinder is deactivated in cylinder deactivation mode, and wherein four cylinders, comprising the second cylinder, are firing in combustion mode.

18. The method of claim 1, wherein the engine comprises six cylinders, and wherein two cylinders, comprising the first cylinder, are activated for engine braking mode, wherein the third cylinder is deactivated in cylinder deactivation mode, and wherein three cylinders, comprising the second cylinder, are firing in combustion mode.

19. The method of claim 1, wherein the engine comprises six cylinders, wherein two cylinders, comprising the first cylinder, are activated for engine braking mode, and wherein two cylinders, comprising the third cylinder, are deactivated in cylinder deactivation mode, and wherein two cylinders, comprising the second cylinder, are firing in combustion mode.

20. The method of claim 1, wherein respective intake valves and respective exhaust valves of the one or more valves of the first cylinder and of the third cylinder are configured to switch between active engine braking mode, deactivated in cylinder deactivation mode, and firing in combustion mode.

21. The method of claim 1, further comprising exiting the increased heat output engine cycle pattern when the exhaust reaches a threshold temperature.

22. The method of claim 1, further comprising sensing a load on the engine; and exiting the increased heat output engine cycle pattern when the load on the engine reaches a threshold load.

23. The method of claim 1, further comprising cycling the increased heat output engine cycle pattern to regulate exhaust temperature in a vehicle aftertreatment system, wherein cycling the increased heat output engine cycle pattern comprises switching cylinders of the multiple-cylinder engine between the increased heat output engine cycle pattern and the combustion mode.

24. The method of claim 1, further comprising sensing a pollution level, and implementing the increased heat output engine cycle pattern in response to the sensed exhaust pollution level.

25. The method of claim 1, wherein sensing the low temperature condition comprises monitoring a catalyst temperature.

26. The method of claim 1, wherein sensing the low temperature condition comprises monitoring a start-up of the engine.

27. The method of claim 1, wherein the cylinders of the multiple-cylinder, reciprocating-piston engine are independently controllable such that a cylinder assigned to any one of the firing mode, the engine braking mode, or the cylinder deactivation mode can switch to a different one of the firing mode, the engine braking mode, or the cylinder deactivation mode when the respective piston for the cylinder ends one piston stroke and begins a new piston stroke.

28. The method of claim 1, further comprising sensing an increased exhaust temperature greater than the low temperature condition; and activating the deactivated third cylinder to exit the cylinder deactivation mode in response to the increased exhaust temperature.

29. The method of claim 28, further comprising sensing a threshold pollution management temperature; and discontinuing the engine braking mode in response to the sensed threshold pollution management temperature.

30. The method of claim 1, further comprising running a timer; sensing an exhaust time; and when the exhaust time exceeds an exhaust time threshold, entering a diesel particulate regeneration mode by implementing the increased heat output engine cycle pattern.

31. The method of claim 1, further comprising adjusting a quantity of fuel injected in to the firing second cylinder to increase the torque output of the firing second cylinder.

32. The method of claim 1, further comprising adjusting a quantity of fuel injected into the firing second cylinder to adjust the temperature of the exhaust output from the firing second cylinder.

33. The method of claim 1, further comprising heating an aftertreatment device from an ambient temperature to a target temperature at or above 250 degrees Centigrade within 90 and 550 seconds.

34. The method of claim 1, further comprising heating an aftertreatment device from an ambient temperature to a target temperature at or above 250 degrees Centigrade within 90 and 180 seconds.

35. The method of claim 1, further comprising heating an aftertreatment device to a target temperature at or above 250 degrees Centigrade within 90 and 120 seconds.

36. The method of claim 1, further comprising heating an aftertreatment device from an ambient temperature to a target temperature at or above 250 degrees Centigrade within 10 and 90 seconds.

37. The method of claim 1, further comprising sensing a load demand on the engine; calculating an air to fuel ratio for the second cylinder to meet the load demand; and adjusting fuel injected to the second cylinder to meet the load demand.

38. The method of claim 1, further comprising supplying an amount of air and an amount of fuel to the second cylinder to maximize heat output from the second cylinder.

39. The method of claim 1, further comprising supplying an amount of air and an amount of fuel to the second cylinder to maximize torque output from the second cylinder.

40. The method of claim 1, further comprising supplying an increased amount of air and an increased amount of fuel to the second cylinder in response to the sensed low temperature condition, and heating the exhaust to a threshold temperature using the supplied increased amount of air and increased amount of fuel.

41. The method of claim 39, further comprising calculating a delta temperature between the sensed low temperature condition and a predetermined threshold temperature; and adjusting the amount of air and the amount of fuel supplied to the second cylinder to raise the low temperature condition to the predetermined threshold temperature.

42. The method of claim 1, wherein respective intake valves and respective exhaust valves of the one or more valves of the first cylinder and of the third cylinder are configured to switch between active engine braking mode, deactivated in cylinder deactivation mode, and firing in combustion mode, wherein the method further comprises calculating a delta temperature between the sensed low temperature condition and a light-off temperature; and switching between active engine braking mode, deactivated in cylinder deactivation mode, and firing in combustion mode on the respective intake valves and on the respective exhaust valves of the first cylinder and the third cylinder to achieve time-efficient light-off.

43. The method of claim 39, wherein a respective intake valve and a respective exhaust valve of the one or more valves of the first cylinder are configured to switch between active engine braking mode, deactivated in cylinder deactivation mode, and firing in combustion mode, wherein the method further comprises calculating a delta temperature between the sensed low temperature condition and a light-off temperature; and switching between active engine braking mode, deactivated in cylinder deactivation mode, and firing in combustion mode on the respective intake valve and a respective exhaust valve of the first cylinder to achieve time-efficient light-off.

44. The method of claim 1, further comprising supplying an amount of air and an amount of fuel to the second cylinder to maximize a fuel economy of the second cylinder.

45. The method of claim 1, wherein the engine braking mode is activated outside of emergency brake operation modes.

46. The method of claim 1, further comprising supplying an amount of air and an amount of fuel to the second cylinder to control the brake thermal efficiency of the second cylinder in response to the sensed low temperature condition.

47. The method of claim 1, further comprising sensing a load on the engine; and adjusting an amount of air and an amount of fuel to the cylinders firing in combustion mode, wherein the adjusting comprises optimizing the brake thermal efficiency of the second cylinder in response to the sensed low temperature condition and optimizing the torque output of the remaining cylinders firing in combustion mode in response to the sensed load on the engine.

48. The method of claim 1, further comprising sensing a load on the engine; and adjusting an amount of air and an amount of fuel to the cylinders firing in combustion mode, wherein the adjusting comprises optimizing the brake thermal efficiency of the second cylinder in response to the sensed low temperature condition and optimizing the fuel economy of the remaining cylinders firing in combustion mode in response to the sensed load on the engine.

49. The method of claim 1, wherein implementing an increased heat output engine cycle pattern further comprises adjusting fuel injection to the second cylinder to increase a torque output of the second cylinder to be greater than a target engine crankshaft torque output, and wherein activating engine braking mode reduces the torque output of the second cylinder to result in the target engine crankshaft torque output.

50. The method of claim 1, wherein implementing an increased heat output engine cycle pattern further comprises adjusting fuel injection to the second cylinder to increase a torque output of the second cylinder to be greater than a target engine crankshaft torque output, and wherein deactivating the third cylinder in cylinder deactivation mode reduces the torque output of the third cylinder to result in the target engine crankshaft torque output.

51. The method of claim 1, wherein firing a second cylinder of the engine in a combustion mode comprises increasing fuel injection to increase a torque output of the combustion cylinders.

52. The method of claim 1, further comprising switching to an engine cycle pattern comprising terminating fuel injection to all of the cylinders of the multiple-cylinders.

53. The method of claim 1, further comprising switching the firing second cylinder to a non-firing cylinder by terminating fuel injection to the second cylinder; and pumping fluid through the second cylinder by opening and closing a respective intake valve and a respective exhaust valve for the second cylinder.

54. A method for exhaust temperature management in a multiple-cylinder combustion engine, comprising:
- deactivating fuel injection to a first cylinder and to a second cylinder of the multiple-cylinder combustion engine during an engine cycle pattern;
- deactivating an intake valve and an exhaust valve of the first cylinder to close the first cylinder during the engine cycle pattern; and
- engine-braking the second cylinder by opening one of the valves of the second cylinder after a compression stroke of the engine during the engine cycle pattern.

55. The method of claim 54, further comprising firing a third cylinder of the multiple-cylinder combustion engine in a combustion mode during the engine cycle pattern comprising the second cylinder engine-braking and the first cylinder deactivating the intake valve and the exhaust valve.

56. A multiple cylinder diesel engine system, comprising:
- a multiple cylinder diesel engine comprising a respective intake valve and a respective exhaust valve for each of the multiple cylinders;
- a valve control system connected to simultaneously deactivate a respective intake valve and a respective exhaust valve to close a selected first cylinder of the multiple cylinder diesel engine, and connected to simultaneously engine brake a selected second cylinder of the multiple cylinder diesel engine, and connected to simultaneously follow a firing stroke pattern on a third cylinder of the multiple cylinder diesel engine; and
- a fuel injection control system connected to selectively deactivate fuel injection to the selected deactivated first cylinder and to the selected engine braking second cylinder while selectively increasing fuel to the firing third cylinder,
- wherein the deactivation of the first cylinder comprises the valve control system deactivating the respective intake valve and the respective exhaust valve while the fuel injection control system deactivates fuel injection to the deactivated cylinder, and
- wherein the engine braking of the selected second cylinder comprises the valve control system opening one or both of the respective intake valve and the respective exhaust valve for the second cylinder to implement an engine brake routine.

57. The system of claim 56, further comprising at least one hydraulic lash adjuster affiliated with the valve control system.

58. The system of claim 57, further comprising a hydraulic lash adjuster for each valve of each cylinder of the diesel engine.

59. A method for exhaust temperature management in a multiple-cylinder, reciprocating-piston combustion engine, comprising:
- sensing a low temperature condition of combusted exhaust;
- implementing an increased heat output engine cycle pattern in response to the sensed low temperature condition, comprising:
  - deactivating fuel injection to the multiple cylinders; and
  - controlling respective valves of the multiple cylinders to switch between:
    - deactivating all valves of all the multiple cylinders in a cylinder deactivation mode to close the multiple cylinders; and
    - activating engine braking mode on a first cylinder of the multiple cylinders by opening one or more respective valves of the first cylinder while deactivating all remaining valves of the multiple cylinders in the cylinder deactivation mode.

* * * * *